US010235566B2

(12) United States Patent
Alvarez Gonzalez et al.

(10) Patent No.: US 10,235,566 B2
(45) Date of Patent: Mar. 19, 2019

(54) DETERMINING STOCKPILE VOLUME BASED ON DIGITAL AERIAL IMAGES AND THREE-DIMENSIONAL REPRESENTATIONS OF A SITE

(71) Applicant: Skycatch, Inc., San Francisco, CA (US)

(72) Inventors: Rodolfo Ruben Alvarez Gonzalez, Jalisco (MX); Manlio Francisco Barajas Hernandez, Jalisco (MX); Leonardo Felipe Romo Morales, Jalisco (MX); David Chen, San Francisco, CA (US)

(73) Assignee: SKYCATCH, INC., San Francisco, CA (US)

( * ) Notice: Subject to any disclaimer, the term of this patent is extended or adjusted under 35 U.S.C. 154(b) by 45 days.

(21) Appl. No.: 15/656,771

(22) Filed: Jul. 21, 2017

(65) Prior Publication Data
US 2019/0026531 A1 Jan. 24, 2019

(51) Int. Cl.
*G06K 9/00* (2006.01)
*G06T 7/62* (2017.01)
*G06K 9/62* (2006.01)
*G06K 9/46* (2006.01)
*G06T 17/05* (2011.01)

(52) U.S. Cl.
CPC ......... *G06K 9/0063* (2013.01); *G06K 9/4609* (2013.01); *G06K 9/627* (2013.01); *G06K 9/6218* (2013.01); *G06K 9/6256* (2013.01); *G06T 7/62* (2017.01); *G06T 17/05* (2013.01); *G06T 2207/10024* (2013.01); *G06T 2207/10028* (2013.01); *G06T 2207/10032* (2013.01);
(Continued)

(58) Field of Classification Search
CPC .. G06K 9/0063; G06K 9/4609; G06K 9/6218; G06K 9/6256; G06K 9/627; G06T 7/62; G06T 17/05; G06T 2207/10024; G06T 2207/10028; G06T 2207/10032; G06T 2207/20081; G06T 2207/30181
See application file for complete search history.

(56) References Cited

U.S. PATENT DOCUMENTS 5,502,898 A * 4/1996 Manore ............... G01C 15/002
177/1
6,792,684 B1 * 9/2004 Hyyppa ............... G01B 11/00
33/1 A
(Continued)

*Primary Examiner* — Anand P Bhatnagar
(74) *Attorney, Agent, or Firm* — Keller Jolley Preece

(57) ABSTRACT

Systems and methods are disclosed for utilizing digital aerial images to determine stockpile volumes. In particular, in one or more embodiments, the disclosed systems and methods utilize a UAV to capture a plurality of digital aerial images portraying stockpiles on a site. The disclosed systems and methods can generate a two-dimensional representation of the site and a three-dimensional representation of the site based on the plurality of digital aerial images. Moreover, the disclosed systems and methods can apply an elevation filter to the three-dimensional representation of the site to identify potential stockpiles. Further, the disclosed systems and methods can utilize a neural network to analyze two-dimensional features and three-dimensional features of the potential stockpiles to identify final stockpiles. The disclosed systems and methods can then utilize three-dimensional stockpile representations to determine stockpile volumes.

20 Claims, 12 Drawing Sheets

(52) U.S. Cl.
CPC ............... *G06T 2207/20081* (2013.01); *G06T 2207/30181* (2013.01)

(56) References Cited

U.S. PATENT DOCUMENTS

| | | | | |
|---|---|---|---|---|
| 7,944,547 | B2* | 5/2011 | Wang | G01C 11/00 356/3.01 |
| 8,155,234 | B2* | 4/2012 | Ho | H04L 1/0668 375/267 |
| 9,904,867 | B2* | 2/2018 | Fathi | G06K 9/00201 |
| 2006/0239537 | A1* | 10/2006 | Shragai | G06K 9/0063 382/154 |
| 2007/0269102 | A1* | 11/2007 | Wang | G01C 11/00 382/154 |
| 2012/0321129 | A1* | 12/2012 | McLaughlin | G06K 9/00637 382/103 |
| 2013/0287290 | A1* | 10/2013 | Owechko | G06T 17/05 382/154 |
| 2014/0310162 | A1* | 10/2014 | Collins | G06F 3/04842 705/39 |
| 2015/0187130 | A1* | 7/2015 | Guskov | G06T 17/20 345/420 |
| 2017/0220887 | A1* | 8/2017 | Fathi | G06K 9/00201 |
| 2017/0221394 | A1* | 8/2017 | Garcia Morchon | G05D 1/104 |
| 2017/0294027 | A1* | 10/2017 | Babenko | G06K 9/4628 |

\* cited by examiner

DETERMINING STOCKPILE VOLUME BASED ON DIGITAL AERIAL IMAGES AND THREE-DIMENSIONAL REPRESENTATIONS OF A SITE

BACKGROUND

In recent years, individuals and businesses have increasingly utilized UAVs to perform a variety of tasks. Indeed, because of the reduced cost of UAVs relative to chartering manned aerial vehicles, businesses and individuals utilize UAVs to perform a variety of flight tasks that have traditionally been cost-prohibitive. For example, it is becoming increasingly common to utilize UAVs to perform flight missions for capturing digital aerial images of a site in construction, land management, mining, or other applications.

Although some conventional systems are able to utilize UAVs to capture digital aerial images of a site, such conventional systems have a number of shortcomings. For example, many customers in construction, land management, or mining applications manage large material stockpiles and need updated estimates of stockpile volumes. Although conventional UAV systems can capture digital aerial images of a site, such systems are unable to quickly and easily identify stockpiles and estimate stockpile volume. Rather, conventional systems require time consuming and laborious processes, such as manually identifying stockpiles and/or stockpile surveying.

Accordingly, a number of problems and disadvantages exist with conventional systems for estimating stockpile volumes utilizing digital aerial images captured by a UAV.

BRIEF SUMMARY

Embodiments of the present disclosure provide benefits and/or solve one or more of the foregoing or other problems in the art with systems and methods for automatically identifying stockpiles and determining stockpile volumes utilizing digital aerial images of a site captured by a UAV. In particular, in one or more embodiments, the disclosed systems and methods utilize digital aerial images captured by a UAV to generate a two-dimensional representation and three-dimensional representation of a site. The disclosed systems and methods can identify potential stockpiles by applying an elevation filter to the three-dimensional representation of the site. Moreover, the disclosed systems and methods can determine whether a potential stockpile is an actual stockpile by applying a neural network to both three-dimensional features and two-dimensional features of the potential stockpile. Upon confirming that the potential stockpile is an actual stockpile utilizing the neural network, the disclosed systems and methods can utilize the three-dimensional representation of the site to accurately determine stockpile volume.

For example, in one or more embodiments, the disclosed systems and methods utilize a plurality of digital aerial images of a site captured by a UAV during a flight to generate a three-dimensional representation of the site and a two-dimensional representation of the site. Moreover, the disclosed systems and methods apply an elevation filter to the three-dimensional representation of the site to generate a three-dimensional representation of a potential stockpile on the site and a boundary of the potential stockpile. Further, the disclosed systems and methods generate a two-dimensional representation of the potential stockpile from the two-dimensional representation of the site based on the identified boundary of the potential stockpile. Moreover, the disclosed systems and methods determine that the potential stockpile is a stockpile by applying a neural network to the two-dimensional representation of the potential stockpile and the three-dimensional representation of the potential stockpile, wherein the neural network is trained to identify stockpiles from two-dimensional training inputs and three-dimensional training inputs. Upon confirming that the potential stockpile is a stockpile, the disclosed systems and methods determine a volume of the stockpile based on the three-dimensional representation of the potential stockpile.

Thus, the disclosed systems and methods can determine stockpile volumes utilizing digital aerial images of a site captured by a UAV. Accordingly, the disclosed systems and methods can avoid the time and cost of manually identifying and/or surveying stockpiles to determine volume. Moreover, by utilizing a neural network that analyzes both two-dimensional and three-dimensional features of potential stockpiles, the disclosed systems and methods can accurately identify stockpiles on a site and avoid incorrectly estimating non-stockpile volumes.

Furthermore, in one or more embodiments, the disclosed systems and methods can also apply a material classifier to determine volumes of different materials within a stockpile. Thus, where stockpiles include multiple materials, the disclosed systems and methods can automatically determine the volume of each material within the stockpile.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

Below is a brief description of the figures referenced in the detailed description.

DETAILED DESCRIPTION

Figure 1:
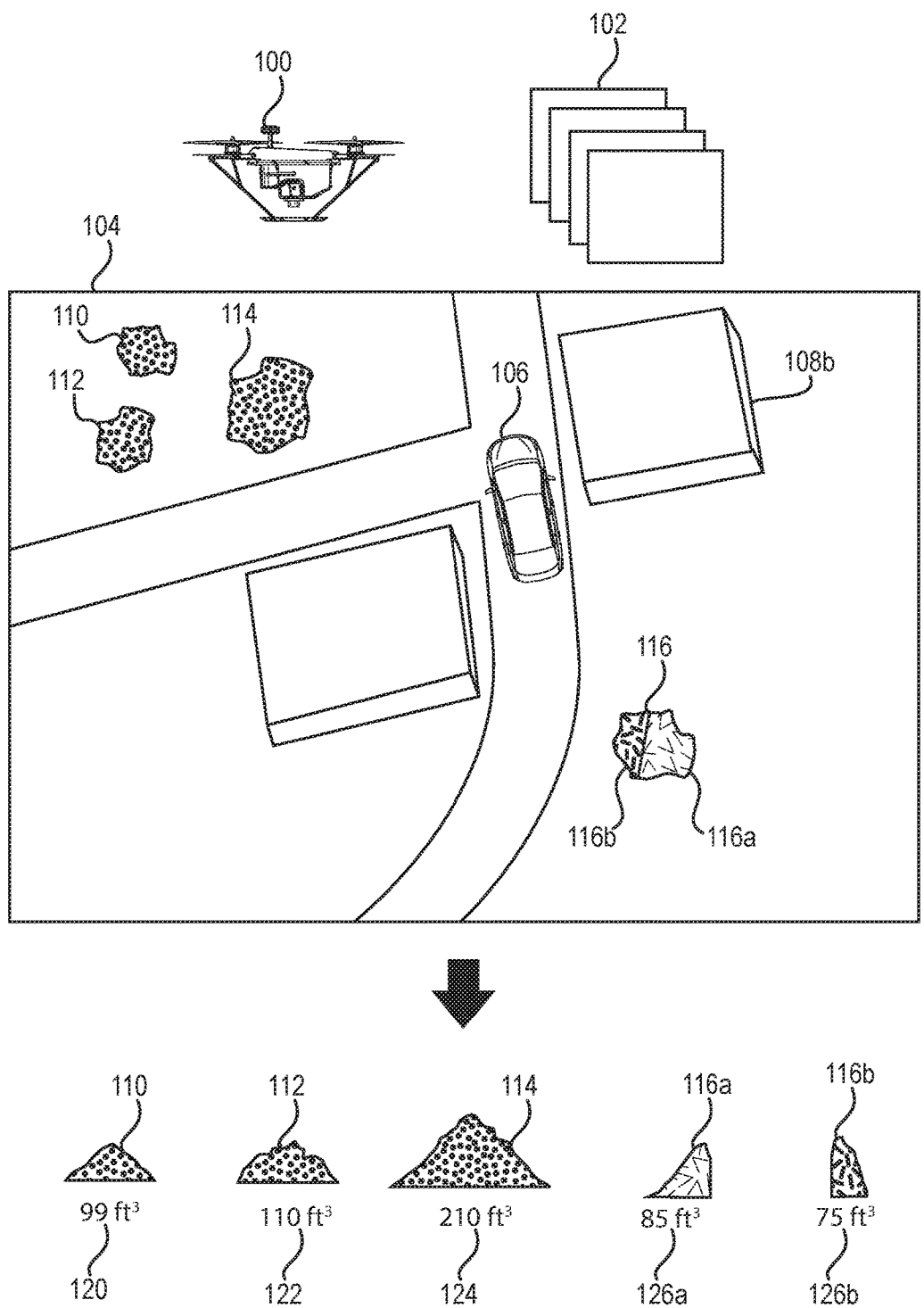
FIG. 1 illustrates a representation of utilizing a UAV to capture digital aerial images of a site and estimate stockpile volumes in accordance with one or more embodiments.

The present disclosure includes various embodiments and features of an aerial stockpile analysis system and corresponding processes that assist in identifying stockpiles and determining stockpile volume on a site based on digital aerial images. In particular, in one or more embodiments the aerial stockpile analysis system generates a three-dimensional model of a site utilizing digital aerial images captured by a UAV in flight and then utilizes the three-dimensional model of the site to identify potential stockpiles. Moreover, the aerial stockpile analysis system can analyze two-dimensional features and the three-dimensional features of the potential stockpiles utilizing a neural network to confirm that the potential stockpiles reflect actual stockpiles. Further, the aerial stockpile analysis system can determine volumes of the stockpiles based on the three-dimensional representation of the site.

To illustrate, in one or more embodiments, the aerial stockpile analysis system generates a two-dimensional representation of a site and a three-dimensional representation of the site based on digital aerial images captured by a UAV. The aerial stockpile analysis system can apply an elevation filter to generate a three-dimensional representation of a potential stockpile with a corresponding boundary of the potential stockpile. Furthermore, the aerial stockpile analysis system can generate a two-dimensional representation of the potential stockpile utilizing the two-dimensional representation of the site and the identified boundary. Utilizing the two-dimensional representation of the potential stockpile and the three-dimensional representation of the stockpile, the aerial stockpile analysis system can then determine whether the potential stockpile is an actual stockpile. Specifically, the aerial stockpile analysis system can analyze both two-dimensional features (from the two-dimensional representation of the stockpile) and three-dimensional features (from the three-dimensional representation of the stockpile) utilizing a neural network to determine whether the potential stockpile is an actual stockpile.

Upon utilizing a neural network to confirm that the potential stockpile is a stockpile, the aerial stockpile analysis system can determine stockpile volume. In particular, the aerial stockpile analysis system can utilize the three-dimensional model of the stockpile and a reference surface to determine a stockpile volume. Specifically, in one or more embodiments, the aerial stockpile analysis system generates a reference surface from the stockpile boundary and then determines a stockpile volume by analyzing the volume between the reference surface and the three-dimensional representation of the stockpile.

The aerial stockpile analysis system provides a number of advantages over conventional systems. For instance, by utilizing an elevation filter that analyzes a three-dimensional representation of a site, and a neural network trained based on both two-dimensional and three-dimensional features, the aerial stockpile analysis system can quickly, automatically, and accurately identify stockpiles on a site. Moreover, the aerial stockpile analysis system can then estimate a volume of the identified stockpiles utilizing the three-dimensional representation of the site. Accordingly, the aerial stockpile analysis system can automatically, quickly, and accurately determine the volume of one or more stockpiles utilizing a plurality of digital aerial images.

In addition, in one or more embodiments, the aerial stockpile analysis system applies a material classifier to identify different materials within the same stockpile. For instance, the aerial stockpile analysis system can apply a material classifier to a two-dimensional representation of a stockpile to identify a boundary between two different materials within the stockpile. The aerial stockpile analysis system can then determine a volume of each material within the stockpile. Thus, the aerial stockpile analysis system can not only determine stockpile volume based on digital aerial images, but can identify volumes of different materials within a stockpile based on digital aerial images.

Furthermore, the aerial stockpile analysis system can also track the volume of one or more stockpiles on a site over time. Indeed, the aerial stockpile analysis system can utilize identified stockpiles from a first collection of digital aerial images of a site (captured during a first period of time, such as a first flight of a UAV) to identify stockpiles and determine stockpile volumes in a second collection of digital aerial images of the site (captured during a second period of time, such as a second flight of one or more UAVs). Accordingly, the aerial stockpile analysis system can automatically determine, monitor, and report stockpile volumes on a site over time.

As mentioned above, in one or more embodiments, the aerial stockpile analysis system identifies stockpile locations from a plurality of digital aerial images. In particular, in one or more embodiments, the aerial stockpile analysis system captures a plurality of digital aerial images of a site utilizing a UAV. For example, the aerial stockpile analysis system can utilize a UAV to traverse a site and capture digital aerial images of the site.

Upon capturing a plurality of digital aerial images, the aerial stockpile analysis system can utilize the digital aerial images to generate a three-dimensional representation of the site and a two-dimensional representation of the site. For example, in one or more embodiments, the aerial stockpile analysis system utilizes a structure from motion algorithm and constrained bundle adjustment algorithm to generate a three-dimensional representation of the site utilizing a plurality of digital aerial images. Moreover, the aerial stockpile analysis system can also utilize a structure from motion algorithm and constrained bundle adjustment algorithm to generate a two-dimensional representation of the site, such as an orthophoto.

As mentioned above, the aerial stockpile analysis system can also apply an elevation filter to the three-dimensional representation of the site to identify potential stockpiles. For example, the aerial stockpile analysis system can analyze elevation data from the three-dimensional representation of the site at the potential stockpile locations to determine whether the elevation data reflects a stockpile or a non-ground object (e.g., a vehicle or structure). In response to identifying non-ground objects, the aerial stockpile analysis system can filter the non-ground objects from the three-dimensional representation of the site and the potential stockpile locations. Furthermore, upon removing non-ground objects, the aerial stockpile analysis system can analyze elevation data to identify stockpiles from the three-dimensional representation of the site. Specifically, the aerial stockpile analysis system can analyze elevation data in light of a stockpile gradient threshold to identify stockpiles from the three-dimensional site representation.

In addition, in one or more embodiments, the aerial stockpile analysis system also utilizes a neural network to ensure the accuracy of identified stockpiles. In particular, in one or more embodiments, the aerial stockpile analysis system trains the neural network to classify input models as stockpiles or other objects. Specifically, the aerial stockpile analysis system can train the neural network to classify models as stockpiles based on two-dimensional inputs and three-dimensional inputs. The aerial stockpile analysis system then utilizes the trained neural network to identify stockpiles based on two-dimensional representations of potential stockpiles and three-dimensional representations of potential stockpiles.

Upon identifying one or more stockpiles, the aerial stockpile analysis system can also determine stockpile volume. In particular, the aerial stockpile analysis system can utilize a boundary of the stockpile from the three-dimensional representation of the site to determine a ground reference surface (e.g., a three-dimensional representation of the ground underlying the stockpile). Utilizing the ground reference surface and the three-dimensional representation of the stockpile, the aerial stockpile analysis system can automatically calculate the volume of the stockpile.

As used herein, the term "UAV" or "unmanned aerial vehicle" refers to an aircraft that can be piloted autonomously or remotely by a control system. A UAV may include any type of unmanned aircraft, including a micro UAV, low altitude UAV, or high altitude UAV, whether autonomously or remotely piloted. Moreover, a UAV may include a multi-rotor UAV, single-rotor UAV, blimp UAV, or other types of UAVs. In one or more embodiments, a UAV comprises a camera and/or GPS receiver affixed to the UAV.

As used herein, the term "digital aerial image" refers to any digital symbol, picture, icon, or illustration captured by a camera in the air. For example, the term "digital aerial image" includes a digital picture captured by a camera affixed to a UAV in flight. The term "digital aerial image" includes digital files with the following, or other, file extensions: JPG, TIFF, BMP, PNG, RAW, or PDF. The term "digital aerial image" also includes one or more images (e.g., frames) in a digital aerial video (e.g., a digital video captured from a UAV in flight).

As used herein the term "location" refers to a position within a space. For example, the term "location" includes coordinates, pixels, or some other indicator describing a position within a two-dimensional or three-dimensional space. To illustrate, a location of a stockpile includes a position (e.g., pixels) of a stockpile within a digital aerial image, a position of a stockpile (e.g., coordinates) within a two-dimensional space comprising a two-dimensional representation of a site, or a position of a stockpile (e.g., coordinates) within a three-dimensional space (e.g., a point within a point cloud) comprising a three-dimensional representation of a site.

As used herein, the term "three-dimensional representation" refers to any digital data depicting an object or site in three-dimensions. In particular, the term three-dimensional representation includes a three-dimensional point cloud, a three-dimensional mesh, a three-dimensional model, or a three-dimensional surface. To illustrate, the term three-dimensional site representation includes a three-dimensional point cloud derived from the observation of a site from multiple views.

As used herein, the term "two-dimensional representation" refers to any digital data depicting an object or site in two-dimensions. In particular, the term two-dimensional representation includes an orthophoto, a map, or an overhead depiction of an object or a site.

As used herein, the term "site" refers to a location on Earth. In particular, the term site includes a location on Earth with one or more stockpiles. The term site can include a construction site, a mining site, a property, a wilderness area, a disaster area, or other location.

As used herein, the term "neural network" refers to a machine learning model that can be tuned (e.g., trained) based on inputs to approximate unknown functions. In particular, the term "neural network" can include a model of interconnected layers that communicate and analyze attributes at varying degrees of abstraction to learn to approximate complex functions and generate outputs based on a plurality of inputs provided to the model. For instance, the term "neural network" includes one or more machine learning algorithms. In particular, the term "neural network" includes deep convolutional neural networks (i.e., "CNNs"), fully convolutional neural networks (i.e., "FCNs"), multi-layer perceptron algorithms, or recurrent neural networks. Thus, a neural network includes an algorithm that implements deep learning techniques, i.e., machine learning that utilizes a set of algorithms to attempt to model high-level abstractions in data.

As used herein, the term "training" refers to data utilized to train a neural network. Thus, a "two-dimensional training representation" refers to a two-dimensional representation (or features corresponding to a two-dimensional representation) provided to a neural network to train the neural network. Similarly, a "three-dimensional training representation" refers to a three-dimensional representation provided to a neural network to train the neural network. Furthermore, "training model" or "training input" refers to a model of a stockpile (e.g., a three-dimensional stockpile representation or a two-dimensional stockpile representation) or other object utilized to train a neural network.

As used herein, the term "stockpile" refers to a collection of matter. In particular, the term "stockpile" refers to a collection of one or more materials on a surface (e.g., on a ground surface). For example, the term stockpile includes a large collection of earth, ore, rock, mining products, or other material on a site. For instance, a stockpile includes a mound of material collected at a location of a site.

As used herein, the term "potential stockpile" refers to an object or data that may correspond to a stockpile. For instance, the term "potential stockpile" includes pixels of a digital image that may portray a stockpile. Similarly, a potential stockpile includes a portion of a site that may contain a stockpile (e.g., a portion of a site identified as a stockpile but not yet confirmed as a stockpile). For example, a potential stockpile includes a location of a three-dimensional representation of a site that is identified as a stockpile (e.g., by an elevation filter) but that has not yet been confirmed as a stockpile (e.g., by a neural network).

As used herein, the term "elevation filter" refers to an algorithm for identifying one or more stockpiles based on three-dimensional coordinates of a three-dimensional representation. In particular, the term "elevation filter" includes an algorithm that removes one or more points of a three-dimensional representation based on elevation. For example, the term "elevation filter" includes a ground return algorithm that identifies non-ground and/or ground objects based on elevation of points within a three-dimensional representation. Specifically, the term "elevation filter" includes a ground return algorithm that removes non-ground objects from a three-dimensional representation. Similarly, the term "elevation filter" includes an algorithm that analyzes elevation of points in a three-dimensional representation of a site and identifies potential stockpiles. For example, the term "elevation filter" includes an algorithm that compares points in a three-dimensional representation of a site to a stockpile gradient threshold to identify potential stockpiles. Additional detail regarding elevation filters utilized by the aerial stockpile analysis system in accordance with one or more embodiments is provided below.

Turning now to FIG. 1, additional detail will be provided regarding estimating stockpile volume in accordance with one or more embodiments of the aerial stockpile analysis system. In particular, FIG. 1 illustrates a UAV 100 capturing a plurality of digital aerial images 102 of a site 104 during a first period of time (e.g., during a first flight). As shown, during the first period of time the site 104 includes a vehicle 106, structures 108a, 108b, and a plurality of stockpiles 110-116. Moreover, as shown in FIG. 1, the stockpile 116 comprises two different materials. Accordingly, the stockpile 116 includes a first stockpile 116a of a first material and a second stockpile 116b of a second material.

As discussed above, clients often seek to know volumes of the stockpiles 110-116 (and the volume of the individual materials within the first stockpile 116a and the second stockpile 116b). For example, the site 104 can represent a construction site with stockpiles of fill material utilized to raise elevation of the construction site to satisfy engineering demands. Construction managers often need to know the amount of fill available as a construction project progresses to ensure that the site has sufficient supply and/or to arrange for sale and delivery of excess material.

Utilizing the plurality of digital aerial images 102, the aerial stockpile analysis system identifies the stockpiles 110-116 (and the first and second stockpiles 116a, 116b) and determines volumes 120-126b. For instance, the aerial stockpile analysis system identifies locations of the stockpiles 110-116 by generating a two-dimensional representation and a three-dimensional representation of the site 104. In particular, the aerial stockpile analysis system applies an elevation filter to the three-dimensional model of the site 104 to identify locations of potential stockpiles. Specifically, the aerial stockpile analysis system applies an elevation filter to identify locations of potential stockpiles and generate three-dimensional representations of potential stockpiles and corresponding boundaries.

Furthermore, the aerial stockpile analysis system generates two-dimensional representations of the potential stockpiles. For example, utilizing the boundaries of the potential stockpile, the aerial stockpile analysis system crops two-dimensional representations of potential stockpiles from the two-dimensional representation of the site 104.

The aerial stockpile analysis system utilizes the two-dimensional representations of potential stockpiles to determine different materials within a stockpile. For example, the aerial stockpile analysis system applies a material classifier to a two-dimensional representation of the (potential) stockpile 116 to identify a boundary between the first material and the second material. The aerial stockpile analysis system then utilizes the boundary to identify the first (potential) stockpile 116a and the second (potential) stockpile 116b.

Utilizing the two-dimensional representations of the potential stockpiles and the three-dimensional representations of the potential stockpiles, the aerial stockpile analysis system determines whether the potential stockpiles are actual stockpiles on the site 104. In particular, the aerial stockpile analysis system extracts two-dimensional features from the two-dimensional representations of potential stockpiles and three-dimensional features from the three-dimensional representations of potential stockpiles and analyzes the two-dimensional features and three-dimensional features utilizing a neural network. The neural network analyzes the two-dimensional features and three-dimensional features to classify the potential stockpiles as stockpiles on the site 104 or non-stockpiles. In this manner, the aerial stockpile analysis system identifies the stockpiles 110-116 (and/or the first stockpile 116a and the second stockpile 116b).

Upon confirming the actual stockpiles on the site 104 utilizing the neural network, the aerial stockpile analysis system determines volumes of the actual stockpiles. In particular, the aerial stockpile analysis system determines a ground reference surface (i.e., a surface of the ground underlying the stockpiles 110-116b) and then determines the volumes 120-126b based on three-dimensional representations of the stockpiles and the ground reference surface.

Although FIG. 1 illustrates a particular site with particular stockpiles (e.g., a construction site with fill material stockpiles), the aerial stockpile analysis system can identify stockpiles and estimate stockpile volumes with regard to a variety of sites and a variety of stockpiles. For example, the aerial stockpile analysis system can identify stockpiles on a mining site with regard to stockpiles containing a variety of different mining materials.

Figure 2A:
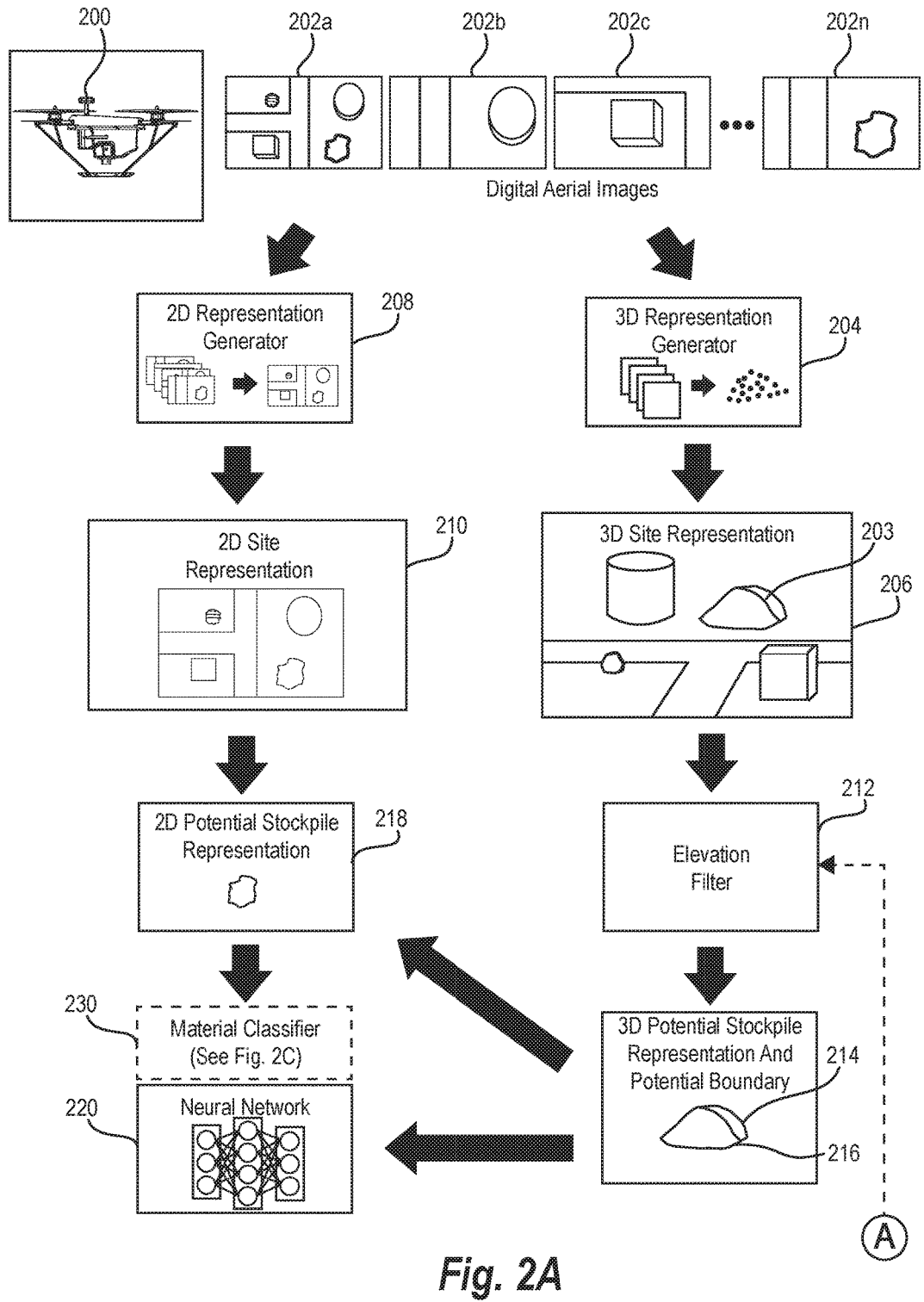
FIGS. 2A-2C illustrate a representation of utilizing digital aerial images, a three-dimensional site representation, a two-dimensional site representation, and a neural network to estimate stockpile volumes in accordance with one or more embodiments.
Figure 2B:
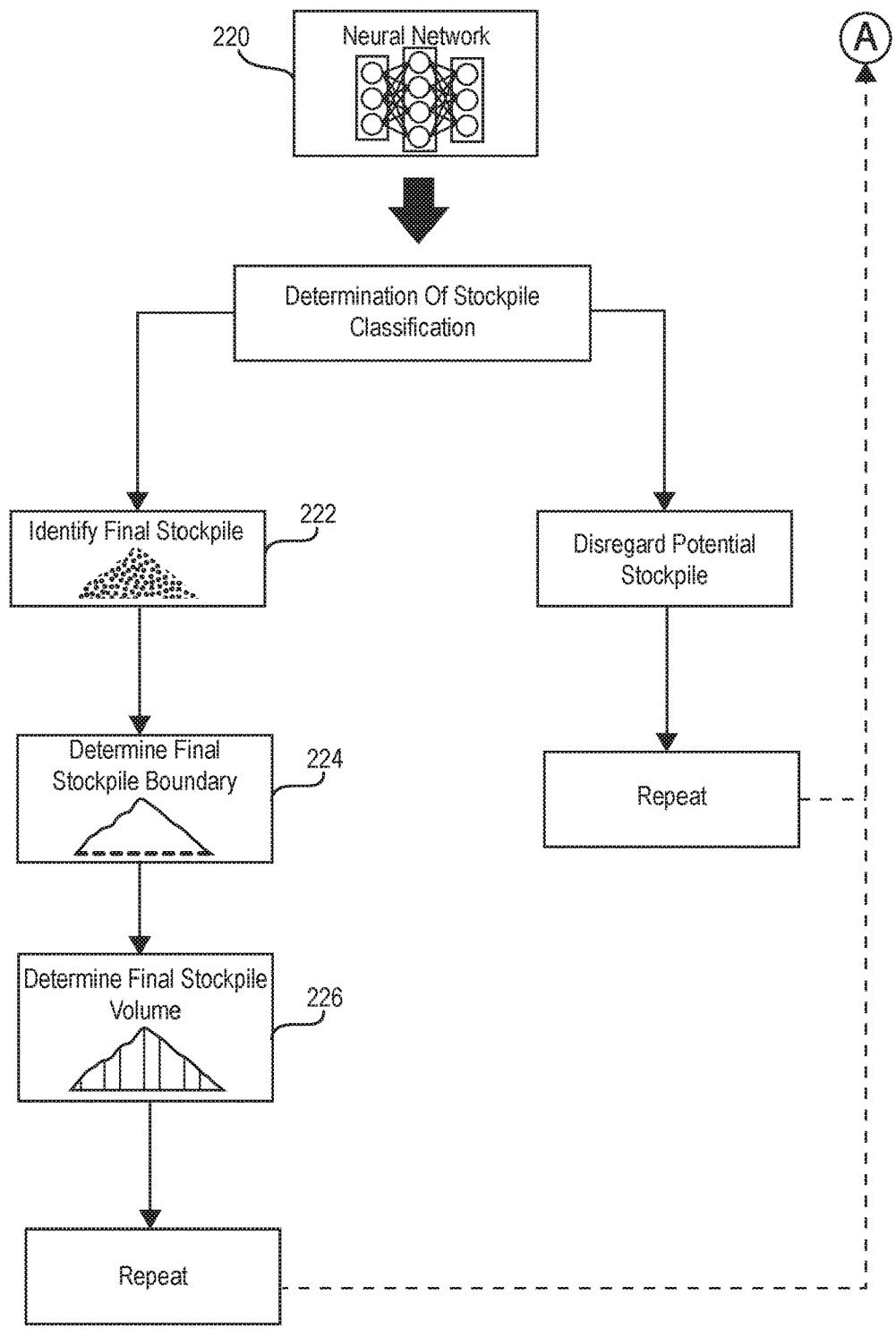

Turning now to FIGS. 2A-2B additional detail will be provided regarding identifying stockpiles and determining stockpile volume in accordance with one or more embodiments of the aerial stockpile analysis system. In particular, FIG. 2A illustrates a plurality of digital aerial images 202a-202n of a site captured by a UAV 200. The aerial stockpile analysis system utilizes the digital aerial images 202a-202n to determine the volume of a stockpile 203 on the site.

Specifically, as shown, the aerial stockpile analysis system provides the digital aerial images 202a-202n to a three-dimensional representation generator 204 to generate a three-dimensional site representation 206. The three-dimensional representation generator 204 includes a system (e.g., one or more computing devices or processors) running one or more algorithms to generate a three-dimensional representation from a plurality of digital aerial images. For example, in one or more embodiments, the three-dimensional representation generator 204 utilizes a structure from motion algorithm and a bundle adjustment algorithm to generate a three-dimensional representation of a site utilizing digital aerial images of the site. Specifically, the aerial stockpile analysis system can utilize a structure from motion algorithm and a bundle adjustment algorithm to determine camera position and other camera parameters utilized to capture the digital aerial images 202a-202n and generate a three-dimensional point cloud of the objects portrayed in the digital aerial images 202a-202n. To illustrate, in one or more embodiments, the three-dimensional representation generator 204 utilizes one or more approaches described in U.S. patent application Ser. No. 14/857,238 (filed Sep. 17, 2015), which is incorporated by reference herein in its entirety.

Accordingly, as shown, the aerial stockpile analysis system can utilize the three-dimensional representation generator 204 to generate the three-dimensional site representation 206. In relation to FIG. 2A, the three-dimensional site representation 206 is a three-dimensional point cloud. Specifically, the three-dimensional site representation 206 is a point cloud comprising a plurality of three-dimensional points that reflect elevations of different portions of the site, including buildings, vegetation, and the stockpile 203.

Furthermore, as shown in FIG. 2A, the aerial stockpile analysis system also provides the digital aerial images 202a-202n to a two-dimensional representation generator 208 to generate a two-dimensional site representation 210. Similar to the three-dimensional representation generator 204, the two-dimensional representation generator 208 can also utilize a structure from motion algorithm and/or a bundle adjustment algorithm to generate a two-dimensional representation of the site, such as an orthophoto.

The two-dimensional representation generator 208 can utilize a variety of alternative approaches to generate the two-dimensional site representation 210. For example, in one or more embodiments, the two-dimensional representation generator 208 aligns digital aerial images to generate a two-dimensional aerial map of a site. Moreover, in one or more embodiments, the two-dimensional representation generator 208 utilizes the three-dimensional site representation 206 to generate the two-dimensional site representation 210.

As mentioned above, in one or more embodiments, the aerial stockpile analysis system identifies a potential stockpile by applying an elevation filter to a three-dimensional representation of a site. For example, as shown in FIG. 2A, the aerial stockpile analysis system utilizes an elevation filter 212 to generate a three-dimensional potential stockpile representation 214 and a potential stockpile boundary 216. Specifically, the aerial stockpile analysis system applies the elevation filter 212 that filters non-ground objects from the three-dimensional site representation 206 based on elevation data and then identifies potential stockpiles based on elevation and a stockpile threshold gradient.

As just mentioned, in one or more embodiments, the elevation filter 212 comprises a ground return algorithm. In particular, in relation to FIG. 2A, the aerial stockpile analysis system applies the elevation filter 212 by applying a ground return algorithm to the three-dimensional site representation 206 to generate a filtered three-dimensional site representation. For example, the aerial stockpile analysis system applies a ground return algorithm that identifies ground objects and/or non-ground objects within the three-dimensional site representation 206. The aerial stockpile analysis system then removes the non-ground objects from the three-dimensional site representation 206 to generate a filtered three-dimensional site representation.

The aerial stockpile analysis system can apply a variety of ground return algorithms. For example, in one or more embodiments, the elevation filter 212 analyzes slope and/or elevation of the three-dimensional site representation 206 to determine whether the slope and/or elevation corresponds to a ground object or non-ground object. In particular, the three-dimensional stockpile location filter 212 can analyze elevation of data points of the three-dimensional site representation 206, identify non-ground objects based on the elevation of the data points, and remove the non-ground objects. In this manner, the aerial stockpile analysis system can utilize the elevation filter 212 to remove structures, vehicles, individuals, equipment, vegetation, or any other non-ground objects from the three-dimensional site representation 206.

For instance, in one or more embodiments, the aerial stockpile analysis system can apply an initial morphological filter comprising erosion and dilation operations to the three-dimensional site representation 206. In this manner, the aerial stockpile analysis system can enhance elevation changes and more accurately apply a height or slope threshold to identify and filter non-ground objects. Similarly, the aerial stockpile analysis system can apply a clustering algorithm to data points of the three-dimensional site representation 206 (e.g., points of a point cloud) and remove small clusters that reflect non-ground points. Moreover, in one or more embodiments, the aerial stockpile analysis system divides a site into different regions based on slope, adjusts segmentation parameters based on the different regions, and then applies the different segmentation parameters to the different regions. Specifically, the aerial stockpile analysis system can apply the approach described in U.S. patent application Ser. No. 15/047,512 (filed Feb. 18, 2016), which is incorporated by reference herein in its entirety. Thus, the aerial stockpile analysis system can identify and remove non-ground objects from the three-dimensional site representation 206 to generate a filtered three-dimensional site representation.

In addition to removing non-ground objects, as mentioned above, the aerial stockpile analysis system can also apply the elevation filter 212 to identify potential stockpiles. In particular, the aerial stockpile analysis system can apply the elevation filter 212 to identify potential stockpiles by utilizing a stockpile gradient threshold. To illustrate, in one or more embodiments, the elevation filter 212 identifies potential stockpile locations by comparing slopes of potential stockpiles to a stockpile gradient threshold. For example, the aerial stockpile analysis system can determine a slope of a potential stockpile and compare the determined slope to the stockpile gradient threshold. If the slope of the potential stockpile does not satisfy the stockpile gradient threshold (e.g., falls outside a range of expected slopes corresponding to a stockpile), the aerial stockpile analysis system can filter out the potential stockpile location (e.g., determine that the potential stockpile is not a stockpile).

More specifically, as shown in FIG. 2A, in one or more embodiments, the elevation filter 212 generates a three-dimensional potential stockpile representation 214 by applying a stockpile gradient threshold. For example, the elevation filter 212 identifies a highest remaining point of a filtered three-dimensional site representation (e.g., after all non-ground objects have been removed). Upon identifying the highest point in the filtered three-dimensional site representation, the elevation filter 212 identifies a set of points within a radius of the highest point and applies the stockpile gradient threshold to the set of points. In particular, the elevation filter 212 determines whether one or more points in the set of points satisfies the stockpile gradient threshold (e.g., falls within a range of expected slopes corresponding to a stockpile). If one or more points in the set of points satisfies the stockpile gradient threshold, the aerial stockpile analysis system adds the one or more points to the three-dimensional potential stockpile representation 214.

The aerial stockpile analysis system can continue this approach to expand the three-dimensional potential stockpile representation 214. For example, the aerial stockpile analysis system can select a new point (e.g., one of the newly added points from the first set of points) and identify a second set of points within a radius of the new point. Moreover, the aerial stockpile analysis system can apply the stockpile gradient threshold to the second set of points. If points in the second set of points satisfy the stockpile gradient threshold, the aerial stockpile analysis system can add the points to the three-dimensional potential stockpile representation 214.

In this manner, the aerial stockpile analysis system can expand a three-dimensional potential stockpile representation to include all points reflecting the potential stockpile. Indeed, in one or more embodiments, the aerial stockpile analysis system expands the three-dimensional potential stockpile representation 214 until points within a radius of the potential stockpile fail to satisfy the stockpile gradient threshold.

Similarly, the aerial stockpile analysis system can also identify the potential stockpile boundary 216. For example, the aerial stockpile analysis system can expand the three-dimensional potential stockpile representation 214 until surrounding points do not satisfy the stockpile gradient threshold. The aerial stockpile analysis system can then identify points along the edge of the three-dimensional potential stockpile representation 214 as the potential stockpile boundary 216.

In one or more embodiments, the aerial stockpile analysis system identifies the potential stockpile boundary 216 by also applying a boundary gradient threshold. In particular, the aerial stockpile analysis system can apply a boundary gradient threshold to identify boundary points that transition from a steep slope to a more gradual slope. To illustrate, the aerial stockpile analysis system applies a boundary gradient threshold that comprises a first slope in a first direction and a second slope in a second direction. The aerial stockpile analysis system then identifies the potential stockpile boundary 216 by identifying points that satisfy the boundary gradient.

In one or more embodiments, the aerial stockpile analysis system can determine and/or select a stockpile gradient threshold and/or a boundary gradient threshold. For instance, the aerial stockpile analysis system can analyze known stockpiles to determine a stockpile gradient threshold and/or a boundary gradient threshold. To illustrate, the aerial stockpile analysis system can analyze known stockpiles and determine a range of slopes corresponding to the known stockpiles (and/or boundaries of the known stockpiles). The aerial stockpile analysis system can then apply the determined range of slopes as a stockpile gradient threshold and/or boundary gradient threshold.

As mentioned above, in some circumstances, application of an elevation filter can still result in some potential stockpile locations that do not correspond to actual stockpiles. Accordingly, in one or more embodiments, the aerial stockpile analysis system analyzes potential stockpiles to ensure that they reflect actual stockpiles. In particular, the aerial stockpile analysis system can analyze both two-dimensional features and three-dimensional features of a potential stockpile to ensure that the potential stockpile is an actual stockpile.

For example, as shown in FIG. 2A, the aerial stockpile analysis system utilizes the three-dimensional potential stockpile representation 214 (and/or the potential stockpile boundary 216) together with the two-dimensional site representation 210 to generate a two-dimensional potential stockpile representation 218. For example, the aerial stockpile analysis system can utilize the potential stockpile boundary 216 to crop the two-dimensional site representation 210 and generate the two-dimensional potential stockpile representation 218.

Moreover, as shown in FIG. 2A, the aerial stockpile analysis system can then utilize the two-dimensional potential stockpile representation 218 and the three-dimensional potential stockpile representation 214 in conjunction with a neural network 220 to determine whether the potential stockpile is a stockpile. For instance, the aerial stockpile analysis system can provide the two-dimensional potential stockpile representation 218 and the three-dimensional potential stockpile representation 214 to the neural network 220. The neural network can then analyze features of the two-dimensional potential stockpile representation 218 and the three-dimensional potential stockpile representation 214 to determine whether the potential stockpile is a stockpile (i.e., whether the potential stockpile belongs to a stockpile classification).

Rather than providing a two-dimensional representation and a three-dimensional representation to a neural network, in one or more embodiments, the aerial stockpile analysis system extracts two-dimensional features from a two-dimensional representation, extracts three-dimensional features from a three-dimensional representation, and provides the two-dimensional features and the three-dimensional features to a neural network. For example, in relation to FIG. 2A, the aerial stockpile analysis system extracts two-dimensional features from the two-dimensional potential stockpile representation 218 and extracts three-dimensional features from the three-dimensional stockpile representation 214. Moreover, the aerial stockpile analysis system provides the two-dimensional features and the three-dimensional features to the neural network 220. The neural network 220 then analyzes the two-dimensional features and the three-dimensional features to determine whether the potential stockpile is an actual stockpile.

The aerial stockpile analysis system can extract and provide a variety of different two-dimensional and three-dimensional features. For example, the two-dimensional features can include shape (e.g., an exterior shape of an overhead view of the potential stockpile), area, perimeter (e.g., length of the perimeter around the potential stockpile), width, length, circularity (e.g., a measure of how close a two-dimensional overhead view of the potential stockpile is to a circular shape), color (e.g., a single color, color gradation, color histogram, or color profile), or texture. Similarly, the three-dimensional features can include slope (e.g., slope along one or more surfaces of the three-dimensional stockpile representation 214), elevation profile (e.g., a profile shape generated from the three-dimensional stockpile representation 214), height (e.g., maximum height or average height), volume (e.g., a rough volume estimation), or surface coarseness (e.g., a measure of variation in surface elevation that indicate a smooth or jagged surface).

In relation to FIG. 2A, the aerial stockpile analysis system provides the two-dimensional features and the three-dimensional features to the neural network 220. The neural network 220 analyzes the two-dimensional features and the three-dimensional features and determines whether the features indicate an actual stockpile or a non-stockpile.

As mentioned above, the aerial stockpile analysis system can utilize a neural network that comprises a machine learning algorithm trained to classify objects as stockpiles (or non-stockpiles). In relation to FIG. 2A, the neural network 220 comprises a deep neural network (e.g., a convolutional neural network) that includes a plurality of hidden layers that analyze features of two-dimensional inputs and/or three-dimensional inputs to determine a stockpile classification.

Specifically, the aerial stockpile analysis system trains the neural network 220 utilizing two-dimensional training inputs and three-dimensional training inputs. Specifically, the aerial stockpile analysis system provides positive two-dimensional training inputs (e.g., two-dimensional inputs of a stockpile), positive three-dimensional training inputs (e.g., three-dimensional inputs of a stockpile), negative two-dimensional training inputs (e.g., two-dimensional inputs of non-stockpiles), and/or negative three-dimensional training inputs (e.g., three-dimensional inputs of non-stockpiles). The aerial stockpile analysis system then generates predicted classifications utilizing the neural network for these training inputs. The aerial stockpile analysis system then compares the predicted classifications with ground-truth classifications and trains the neural network 220 based on the comparison. In this manner, the aerial stockpile analysis system trains the neural network 220 to identify significant features from two-dimensional and three-dimensional inputs for predicting a stockpile classification. Moreover, the aerial stockpile analysis system trains the neural network to classify potential stockpile representations utilizing two-dimensional stockpile representations and/or three-dimensional stockpile representations. Additional detail regarding training neural networks is provided below (e.g., in relation to FIG. 4).

As shown in FIGS. 2A, 2B the aerial stockpile analysis system utilizes the neural network 220 (i.e., a trained neural network) to determine a stockpile classification (e.g., whether the potential stockpile belongs to a stockpile classification or a non-stockpile classification). As illustrated in FIG. 2B, if the aerial stockpile analysis system determines (via the neural network 220) that the potential stockpile is a stockpile, the aerial stockpile analysis system can determine the volume of the stockpile.

Specifically, utilizing the neural network 220, the aerial stockpile analysis system identifies the final stockpile 222. For instance, upon determining that the potential stockpile is a stockpile, the aerial stockpile analysis system identifies the final stockpile 222 from the three-dimensional potential stockpile representation 214.

Moreover, as shown in FIG. 2B, upon identifying the final stockpile 222, the aerial stockpile analysis system also determines a final stockpile boundary 224 (i.e., an outer border between the final stockpile 222 and the ground surrounding the final stockpile 222). In particular, the aerial stockpile analysis system can determine the final stockpile boundary 224 for the final stockpile 222 by analyzing the three-dimensional site representation 206 and/or the three-dimensional potential stockpile representations 214. For instance, in one or more embodiments, the aerial stockpile analysis system applies a segmentation algorithm to the location of the final stockpile 222 within the three-dimensional site representation 206 to determine the final stockpile boundary 224.

The aerial stockpile analysis system can also utilize the potential stockpile boundary 216 to determine the final stockpile boundary 224. For instance, the aerial stockpile analysis system can utilize the potential stockpile boundary 216 as an initial boundary for the final stockpile 222. The aerial stockpile analysis system can then utilize a segmentation algorithm in relation to the three-dimensional site representation 206 to refine the boundary of the final stockpile 222 and generate the final stockpile boundary 224.

In particular, the aerial stockpile analysis system can utilize a segmentation algorithm that analyzes variations in elevation data to determine segments of a three-dimensional representation. Specifically, the aerial stockpile analysis system utilizes a segmentation algorithm that detects changes in slope within a three-dimensional representation to identify where the final stockpile 222 begins and ends. In this manner, the aerial stockpile analysis system identifies the final stockpile boundary 224, which defines an outer boundary that encompasses the final stockpile 222.

As shown in FIG. 2B, the aerial stockpile analysis system also utilizes the final stockpile boundary 224 to determine a final stockpile volume 226. For example, the aerial stockpile analysis system utilizes the final stockpile boundary 224 to generate a three-dimensional representation of the final stockpile 222 (e.g., by cropping the stockpile from the three-dimensional site representation 206 utilizing the final stockpile boundary 224). Moreover, the aerial stockpile analysis system can utilize the final stockpile boundary 224 to generate a ground reference surface corresponding to the final stockpile 222. In particular, the aerial stockpile analysis system can utilize the final stockpile boundary 224 to generate a ground reference surface that approximates a ground surface underlying the final stockpile 222.

The aerial stockpile analysis system can then determine the final stockpile volume 226 based on the difference between the three-dimensional representation of the final stockpile 222 and the ground reference surface. In particular, the aerial stockpile analysis system can determine a volume between the ground reference surface defined by the final stockpile boundary 224 and the three-dimensional representation of the final stockpile 222. Thus, as outlined in FIGS. 2A-2B, based on the digital aerial images 202*a*-202*n*, the aerial stockpile analysis system can identify the final stockpile 222 and determine the final stockpile volume 226.

Although FIG. 2B only illustrates a single final stockpile 222 and the corresponding final stockpile volume 226, the aerial stockpile analysis system can identify a plurality of final stockpiles and corresponding stockpile volumes. Indeed, the aerial stockpile analysis system can determine any type or number of stockpiles on a site and their corresponding volumes.

For instance, as shown in FIG. 2B, upon determining the final stockpile volume 226 the aerial stockpile analysis system can repeat one or more steps or acts to identify a final volume of additional stockpiles. For example, as shown in FIGS. 2A, 2B, the aerial stockpile analysis system repeats the process of applying the elevation filter 212, identifying potential stockpiles, generating two-dimensional potential stockpile representations and three-dimensional potential stockpile representations, applying the neural network 220 to determine if the potential stockpile is an actual stockpile, and determining final stockpile volume.

More specifically, the aerial stockpile analysis system removes the final stockpile 222 from the filtered three-dimensional stockpile representation and applies the elevation filter 212 by identifying the highest point remaining in the filtered three-dimensional stockpile representation and utilizing the stockpile gradient threshold to identify a second potential stockpile. The aerial stockpile analysis system then generates a second three-dimensional potential stockpile representation, generates a second two-dimensional stockpile representation, and applies the neural network 220 to determine if the second potential stockpile is an actual stockpile. If the second potential stockpile is a second stockpile, the aerial stockpile analysis system can determine the volume of the second stockpile.

As shown in FIG. 2B, if the aerial stockpile analysis system determines (via the neural network 220) that the potential stockpile is not an actual stockpile, the aerial stockpile analysis system discards the potential stockpile. Specifically, the aerial stockpile analysis system removes the potential stockpile from the three-dimensional site representation 206 and identifies another potential stockpile from the three-dimensional site representation 206. To illustrate, the aerial stockpile analysis system can remove the potential stockpile from the filtered three-dimensional site representation and then repeat the process described above, by applying the elevation filter 212 to identify an additional potential stockpile, and applying the neural network 220.

The aerial stockpile analysis system can repeat this process until identifying one or more stopping conditions. The aerial stockpile analysis system can utilize a variety of different stopping conditions depending on the embodiment. For example, the aerial stockpile analysis system can utilize a stopping condition that includes a threshold limit of points in the three-dimensional site representation 206. Indeed, as just described, the aerial stockpile analysis system can remove stockpiles (or potential stockpiles) from the three-dimensional site representation 206 (or the filtered three-dimensional site representation) after analysis by the neural network 220. The aerial stockpile analysis system can utilize a threshold of points remaining in the three-dimensional site representation 206 (or a threshold of points removed from the three-dimensional site representation 206) as a stopping condition. To illustrate, the aerial stockpile analysis system can apply a threshold percentage (e.g., 50%) of points as a stopping condition. Upon detecting that more than 50% of the points in the original three-dimensional site representation 206 have been removed (or remain), the aerial stockpile analysis system can stop repeating.

Although the foregoing example describes a threshold percentage of points, the aerial stockpile analysis system can also apply a threshold number of points removed (or remaining). For example, in one or more embodiments, the aerial stockpile analysis system continues repeating until no points (or 50 points or 100 points) remain in the three-dimensional site representation 206.

In addition to a threshold of points, the aerial stockpile analysis system can also apply a stopping condition that includes a threshold number of iterations. For example, the aerial stockpile analysis system can repeat 10 (or 20, 50, 100, etc.) times until reaching the threshold number of iterations.

In one or more embodiments, the aerial stockpile analysis system can select the threshold number of iterations. For example, the aerial stockpile analysis system can select the threshold number of iterations based on the size of a site. Similarly, the aerial stockpile analysis system can select the threshold number of iterations based on user input (e.g., user selection of a threshold number of iterations).

As mentioned above, in some circumstances, application of an elevation filter can result in identifying potential stockpiles with potential stockpile boundaries that are over-inclusive. For example, applying an elevation filter can result in a stockpile boundary that includes stockpiles having multiple different materials (e.g., two stockpiles of different material that have grown together so that they overlap). Similarly, applying an elevation filter can sometimes result in a stockpile boundary that includes part of the ground (part of the ground surrounding the stockpile boundary in addition to the stockpile).

Accordingly, in one or more embodiments, the aerial stockpile analysis system applies a material classifier. In particular, the aerial stockpile analysis system can apply a material classifier that identifies stockpiles that include multiple materials and corresponding material boundaries. The aerial stockpile analysis system can then utilize a neural network to analyze revised stockpiles that correspond to each material to ensure that the revised stockpiles reflect actual stockpiles.

For example, as shown in FIG. 2A the aerial stockpile analysis system can apply a material classifier 230 to the two-dimensional potential stockpile representation 218 (e.g., prior to providing the two-dimensional potential stockpile representation 218 to the neural network 220). The aerial stockpile analysis system can apply the material classifier 230 to determine a boundary between multiple materials in a potential stockpile. The aerial stockpile analysis system can then crop the potential stockpile along the boundary to generate revised potential stockpiles reflecting the different materials. The aerial stockpile analysis system can then analyze the revised potential stockpiles (e.g., utilizing the neural network) to determine whether each of the revised potential stockpiles is an actual stockpile.

Figure 2C:
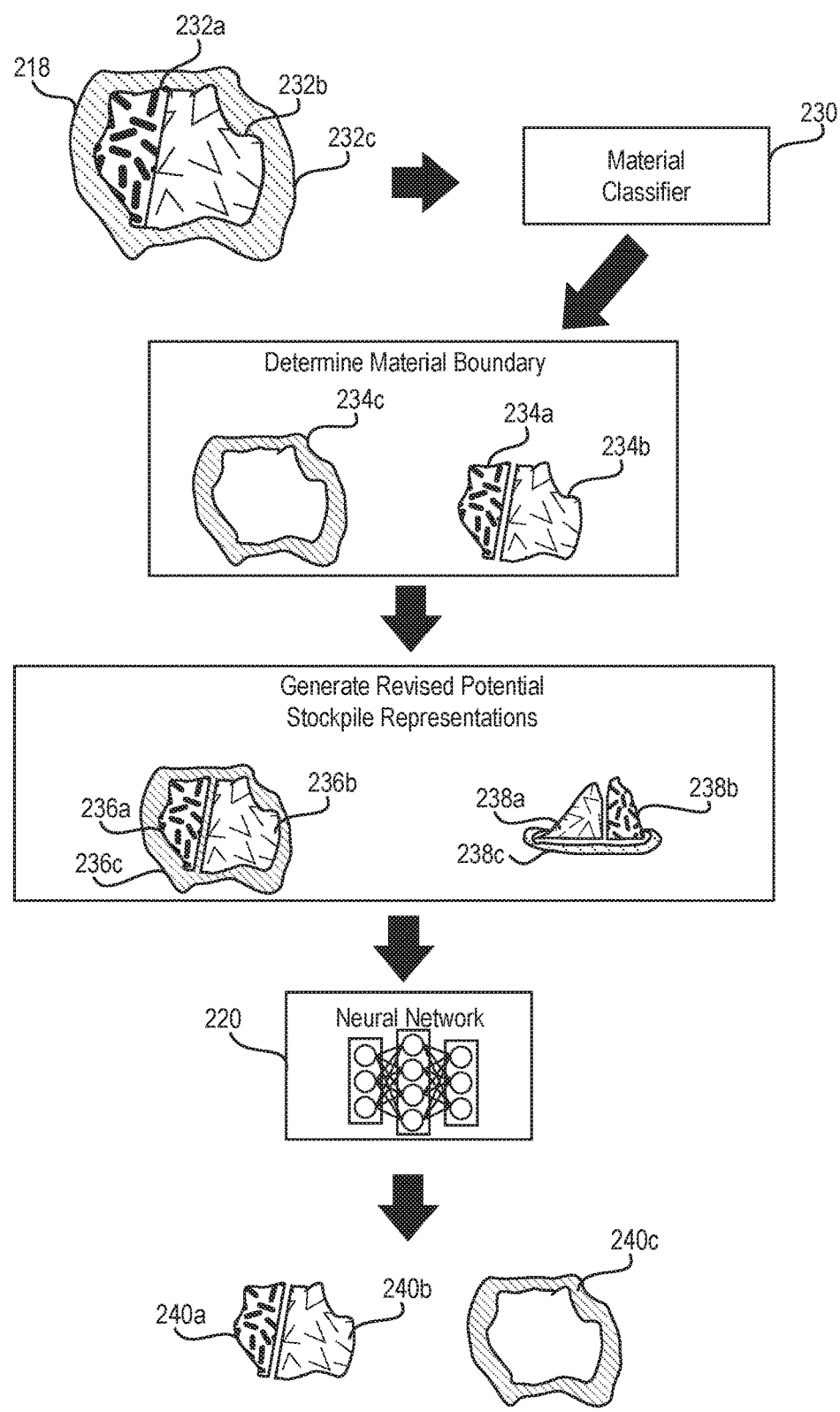

For example, FIG. 2C illustrates applying the material classifier 230 to generate revised potential stockpiles in accordance with one or more embodiments. Specifically, FIG. 2C illustrates an example embodiment of the aerial stockpile analysis system where the two-dimensional potential stockpile representation 218 includes multiple different materials. Indeed, as shown in FIG. 2C, the two-dimensional potential stockpile representation 218 includes a first material 232a (i.e., a first material in the stockpile 203), a second material 232b (i.e., a second material in the stockpile 203), and a third material 232c (i.e., ground material surrounding the stockpile 203). Indeed, in relation to the embodiment of FIG. 2C, the stockpile 203 includes two different materials, and the two-dimensional potential stockpile representation 218 is over-inclusive in that it includes a region of the ground surrounding the stockpile 203.

The aerial stockpile analysis system can isolate the three different materials in the two-dimensional potential stockpile representation 218, determine which materials actually reflect stockpiles, and then determine the volume of the actual stockpiles. Specifically, as shown in FIG. 2C, the aerial stockpile analysis system can apply the material classifier 230 to the two-dimensional potential stockpile representation 218 to determine material boundaries 234a, 234b, and 234c.

The material classifier 230 can include a variety of algorithms for classifying different materials. In particular, the material classifier 230 can include algorithms for classifying different materials from a two-dimensional representation. For instance, in one or more embodiments, the material classifier 230 comprises a clustering algorithm. To illustrate, the material classifier 230 can comprise a k-means clustering algorithm that identifies clusters based on portions (e.g., pixels) of a two-dimensional representation. The aerial stockpile analysis system can apply the material classifier 230 in the form of a k-means clustering algorithm to a two-dimensional representation and group pixels of the two-dimensional representation into clusters corresponding to the materials 232a, 232b, 232c.

In other embodiments, the material classifier 230 includes a neural network. For example, in one or more embodiments, the aerial stockpile analysis system trains a neural network with training two-dimensional representations to identify different materials within a potential stockpile. To illustrate, the aerial stockpile analysis system can provide training two-dimensional representations comprising one or more materials to the material classifier 230. The aerial stockpile analysis system can then utilize the material classifier 230 to predict materials (e.g., material boundaries) within the training two-dimensional representations. The aerial stockpile analysis system can train the material classifier 230 by comparing the predicted materials with the ground truth materials (e.g., ground-truth material boundaries). Once trained, the aerial stockpile analysis system can utilize the material classifier 230 (i.e., a trained neural network) to determine the materials 232a-232c and/or the material boundaries 234a-234c.

Upon determining that a stockpile contains more than one material (and identifying corresponding material boundaries), the aerial stockpile analysis system can generate revised potential stockpile representations. In particular, the aerial stockpile analysis system can utilize material boundaries and potential stockpile representations to generate revised potential stockpile representations. For example, in FIG. 2C, the aerial stockpile analysis system utilizes the two-dimensional potential stockpile representation 218 and the material boundaries 234a, 234b, and 234c to generate the revised two-dimensional potential stockpile representations 236a, 236b, and 236c. Specifically, the aerial stockpile analysis system crops the two-dimensional potential stockpile representation 218 along the material boundaries 234a, 234b, and 234c, resulting in three revised two-dimensional potential stockpile representations 236a (corresponding to the first material 232a), 236b (corresponding to the second material 232b), and 236c (corresponding to the third material 232c).

Similarly, as illustrated in FIG. 2C, the aerial stockpile analysis system utilizes the three-dimensional potential stockpile representation 214 and the material boundaries 234a, 234b, and 234c to generate revised three-dimensional potential stockpile representations 238a, 238b, and 238c. Specifically, the aerial stockpile analysis system divides the three-dimensional potential stockpile representation 214 along the material boundaries 234a, 234b, and 234c, resulting in three revised three-dimensional potential stockpile representations 238a (corresponding to the first material 232a), 238b (corresponding to the second material 232b), and 238c (corresponding to the third material 232c).

Upon generating revised potential stockpile representations, the aerial stockpile analysis system can analyze the revised potential stockpile representations utilizing a neural network. In particular, the aerial stockpile analysis system can analyze the revised potential stockpile representations to determine whether they reflect actual stockpiles.

For example, as shown in FIG. 2C, the aerial stockpile analysis system utilizes the neural network 220 to analyze the revised two-dimensional potential stockpile representations 236a-236c and the revised three-dimensional potential stockpile representations 238a-238c. Specifically, the aerial stockpile analysis system utilizes the neural network 220 to analyze the revised two-dimensional potential stockpile representation 236a (corresponding to the first material 232a) and the revised three-dimensional potential stockpile representations 238a (also corresponding to the first material 232a). Utilizing the neural network 220, the aerial stockpile analysis system determines that the revised two-dimensional potential stockpile representation 236a and the revised three-dimensional potential stockpile representations 238a reflect a first stockpile 240a. Thus, the aerial stockpile analysis system identifies the first stockpile 240a based on the material boundary 234a, the revised potential two-dimensional stockpile representations 236a, and/or the revised potential three-dimensional stockpile representation 238a.

Similarly, the aerial stockpile analysis system utilizes the neural network 220 to analyze the revised two-dimensional potential stockpile representation 236b (corresponding to the second material 232b) and the revised three-dimensional potential stockpile representations 238b (corresponding to the second material 232b). In particular, utilizing the neural network 220, the aerial stockpile analysis system determines that the revised two-dimensional potential stockpile representation 236b and the revised three-dimensional potential stockpile representations 238b reflect a second stockpile 240b.

Upon identifying the first stockpile 240a and/or the second stockpile 240b, the aerial stockpile analysis system determines a volume of the first stockpile 240a and a volume of the second stockpile 240b. Indeed, as described in relation to FIG. 2B, the aerial stockpile analysis system can determine a final stockpile boundary (e.g., the final stockpile boundary 224) and determine a final stockpile volume (e.g., the final stockpile volume 226) for the first stockpile 240a and/or the second stockpile 240b.

As shown in FIG. 2C, the aerial stockpile analysis system also utilizes the neural network 220 to analyze the revised two-dimensional potential stockpile representation 236c (corresponding to the third material 232c) and the revised three-dimensional potential stockpile representations 238c (corresponding to the third material 232c). Utilizing the neural network 220, the aerial stockpile analysis system determines that the revised two-dimensional potential stockpile representation 236c and the revised three-dimensional potential stockpile representations 238c do not reflect an actual stockpile, but a non-stockpile 240c. Accordingly, as discussed in relation to FIG. 2B, the aerial stockpile analysis system dismisses the non-stockpile 240c. Specifically, the aerial stockpile analysis system removes the non-stockpile 240c from the three-dimensional site representation 206 (and/or the filtered three-dimensional site representation discussed in relation to FIG. 2A).

Although FIG. 2C illustrates a potential stockpile with a plurality of materials 232a-232c, in many circumstances potential stockpiles will only have a single material. In such circumstances, the aerial stockpile analysis system can apply the material classifier 230 and determine that the there is no boundary between multiple different material types. For instance, upon determining that a potential stockpile includes a single material, the aerial stockpile analysis system can proceed to utilizing the neural network 220 to determine whether the potential stockpile is an actual stockpile. In other words, the aerial stockpile analysis system can omit the act of generating revised potential stockpile representations and analyzing the revised potential stockpile representations based on a determination that a potential stockpile is made up of a single material.

As mentioned above, in one or more embodiments, the aerial stockpile analysis system applies an elevation filter to a three-dimensional representation of a site to identify a potential stockpile. In particular, the aerial stockpile analysis system can apply an elevation filter by identifying a highest point in a three-dimensional site representation and then analyzing surrounding points based on a stockpile gradient threshold. For example, FIG. 3 illustrates identifying a potential stockpile from a three-dimensional site representation in accordance with one or more embodiments.

Figure 3:
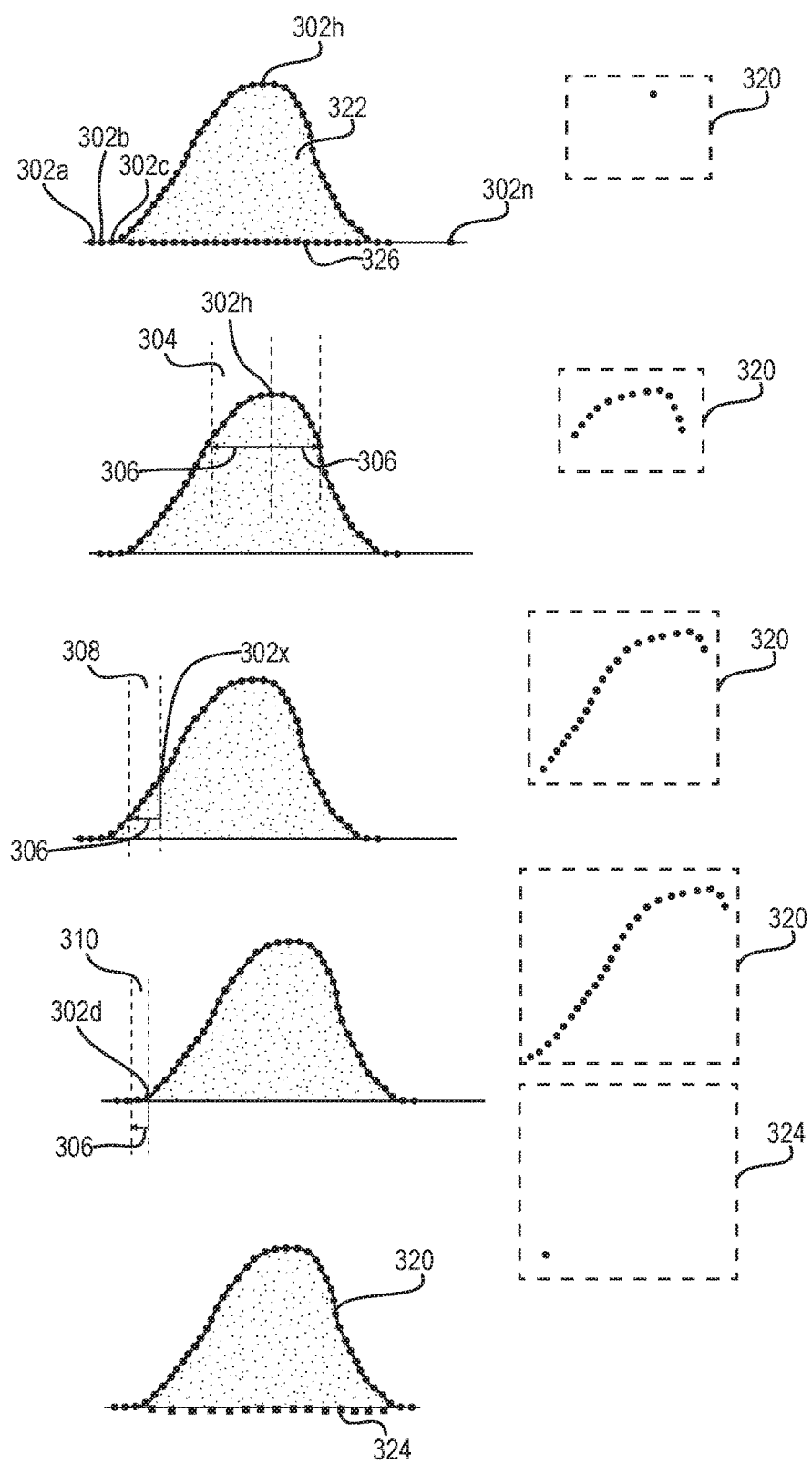
FIG. 3 illustrates a representation of applying an elevation filter to a three-dimensional representation of a site to identify potential stockpiles in accordance with one or more embodiments.

In particular, FIG. 3 illustrates a three-dimensional site representation 300. As shown, the three-dimensional site representation comprises a plurality of points 302a-302n. The aerial stockpile analysis system analyzes the points 302a-302n to identify a set of points 320 included in a potential stockpile 322 and a set of boundary points 324 included in a potential stockpile boundary 326.

Specifically, as shown in FIG. 3, the aerial stockpile analysis system analyzes the plurality of points 302a-302n and identifies a highest point 302h. The aerial stockpile analysis system adds the highest point 302h to the set of points 320 included in the potential stockpile 322. Moreover, the aerial stockpile analysis system then utilizes the highest point 302h to add additional points to the potential stockpile 322. Specifically, the aerial stockpile analysis system analyzes additional points 304 within a radius 306 of the highest point 302h.

As mentioned above, in one or more embodiments, the aerial stockpile analysis system adds points to a potential stockpile based on a stockpile gradient threshold. For example, as shown in FIG. 3, the aerial stockpile analysis system includes the additional points 304 in the set of points 320 corresponding to the potential stockpile 322 based on a determination that the additional points 304 satisfy the stockpile gradient threshold. Specifically, the aerial stockpile analysis system compares the difference in height (and/or distance) between the highest point 302h and each of the additional points 304 to determine whether the gradient between the highest point 302h and each of the additional points 304 satisfies the stockpile gradient threshold.

The stockpile gradient threshold can comprise a variety of gradient measures. For example, the stockpile gradient threshold can comprise a slope or a vertical distance relative to the highest point 302h. To illustrate, the aerial stockpile analysis system can apply the stockpile gradient threshold as a slope of 10 percent (in either direction, up or down). The aerial stockpile analysis system can then analyze the additional points 304 and determine that the additional points are more than a 10 percent slope from the highest point 302h. For instance, one of the additional points 304 may be three inches away from the highest point 302h but one inch below the highest point 302h (resulting in a 33 percent slope that satisfies the 10 percent stockpile gradient threshold).

As shown in FIG. 3, the aerial stockpile analysis system can continue adding points to the set of points 320 included in the potential stockpile 322 based on the stockpile gradient threshold. For example, as shown, the aerial stockpile analysis system identifies a next set of points 308 from the plurality of points 302a-302n. In particular, the aerial stockpile analysis system applies the radius 306 to a point 302x from the additional points 304 to identify the next set of points 308. The aerial stockpile analysis system analyzes the next set of points 308 and determines that each of the points in the next set of points 308 satisfies the stockpile gradient threshold. Accordingly, the aerial stockpile analysis system adds the next set of points 308 to the set of points 320 included in the potential stockpile 322.

The aerial stockpile analysis system can continue analyzing points and adding points to the potential stockpile until identifying points that do not satisfy the stockpile gradient threshold. Upon identifying points that do not satisfy the stockpile gradient threshold, the aerial stockpile analysis system can build a stockpile boundary (i.e., a boundary that defines the end of the potential stockpile and the beginning of the ground).

Indeed, as shown in FIG. 3, the aerial stockpile analysis system analyzes a further set of points 310 within a radius 306 of a point 302d within the set of points 320 included in the potential stockpile 322. The aerial stockpile analysis system determines that one or more of the points in the further set of points 310 do not satisfy the stockpile gradient threshold. For example, one or more of the points in the further set of points 310 lie on a plane that is less than a 10 percent gradient from the point 302d.

The aerial stockpile analysis system can add points that do not satisfy the stockpile gradient threshold to a set of boundary points 324 defining the boundary 326 between the potential stockpile 322 and the ground. For instance, upon determining that the further set of points 310 do not satisfy the stockpile gradient threshold, the aerial stockpile analysis system can add the further set of points 310 to the set of boundary points 324.

In one or more embodiments, the aerial stockpile analysis system utilizes a boundary gradient threshold (in addition to, or in the alternative to, utilizing the stockpile gradient threshold) in generating the set of boundary points 324. For example, in one or more embodiments, the potential stockpile gradient applies a boundary gradient threshold in two different directions to identify boundary points. For example, in one or more embodiments, the aerial stockpile analysis system identifies the set of boundary points 324 by identifying points that have a steep gradient in one direction (e.g., greater than a 10 percent gradient up toward the stockpile) and a small gradient in another direction (e.g., less than a 3 percent gradient in the direction of the ground). Thus, the aerial stockpile analysis system can determine when it encounters points within a flatter region, indicating a boundary of the potential stockpile 322.

In this manner, the aerial stockpile analysis system can define the set of points 320 included in the potential stockpile 322 and the set of boundary points 324. Specifically, the aerial stockpile analysis system can repeatedly add points from the three-dimensional site representation 300 to the potential stockpile 322 based on the stockpile gradient threshold and then add points to the set of boundary points 324 upon entering a flat region at the edge of the stockpile based on the stockpile boundary threshold. In one or more embodiments, the aerial stockpile analysis system repeats this process until there are no additional points that satisfy the stockpile gradient threshold (and/or the boundary gradient threshold). Thus, as shown in FIG. 3, the result of this process is two point clouds: one that reflects a potential stockpile (e.g., the set of points 320), and another that reflects a stockpile boundary (e.g., the set of boundary points 324).

In one or more embodiments, the aerial stockpile analysis system compares the set of points 320 and the set of boundary points 324 to more clearly define a potential stockpile and its corresponding boundary. Specifically, the aerial stockpile analysis system can apply a snitch algorithm to the two point clouds to remove noise (e.g., points erroneously included in the potential stockpile or the stockpile boundary).

For example, in one or more embodiments, the aerial stockpile analysis system applies a snitching algorithm that compares the set of points 320 and the set of boundary points 324. Specifically, the aerial stockpile analysis system can compare the set of points 320 and the set of boundary points 324 and identify overlapping points. The aerial stockpile analysis system can analyze and remove the overlapping points to remove noise between the potential stockpile and the boundary.

To illustrate, the set of points 320 may erroneously include a ground point that extends beyond the stockpile boundary. The aerial stockpile analysis system can compare the set of points 320 with the set of boundary points 324 and identify the ground point that extends beyond the stockpile boundary. The aerial stockpile analysis system can apply a snitching algorithm to remove the ground point from the set of points 320. Similarly, the aerial stockpile analysis system can apply a snitching algorithm to remove points within the set of boundary points 324 that extend into the potential stockpile 322.

Although the foregoing discussion of FIG. 3 describes the radius 306, the stockpile gradient threshold, and the boundary gradient threshold as given constants, in one or more embodiments, the aerial stockpile analysis system selects (and/or modifies) the radius 306, the stockpile gradient threshold, and/or the boundary gradient threshold. For example, the aerial stockpile analysis system can select the stockpile gradient and/or the boundary gradient threshold based on an anticipated material on a site. For instance, if a gravel material on the site has an approximate resting slope of 15 percent, the aerial stockpile analysis system can select a stockpile threshold gradient based on the approximate resting slope (e.g., a stockpile threshold gradient of 10 percent, which is 5 percent less than the approximate resting slope).

In addition, the aerial stockpile analysis system can select a stockpile gradient threshold and/or a boundary gradient threshold based on known slopes or elevation changes on a site (e.g., is the site mountainous, hilly, or flat), a number of anticipated stockpiles on a site, or based on user input. For example, as discussed above, in one or more embodiments, the aerial stockpile analysis system applies a ground-return algorithm that divides a site into different regions based on slope. The aerial stockpile analysis system can select a stockpile gradient threshold and/or the boundary gradient threshold based on an identified region of a site. For example, in a steep region of a site, the aerial stockpile analysis system can apply a steeper stockpile gradient threshold and/or boundary gradient threshold than in a flat region of the site.

Similarly, the aerial stockpile analysis system can select the radius 306 based on a variety of different factors. For instance, the aerial stockpile analysis system can select the radius 306 based on elevation changes in a particular site region, materials in a particular stockpile, approximate stockpile size, site conditions, and/or user input.

Figure 4:
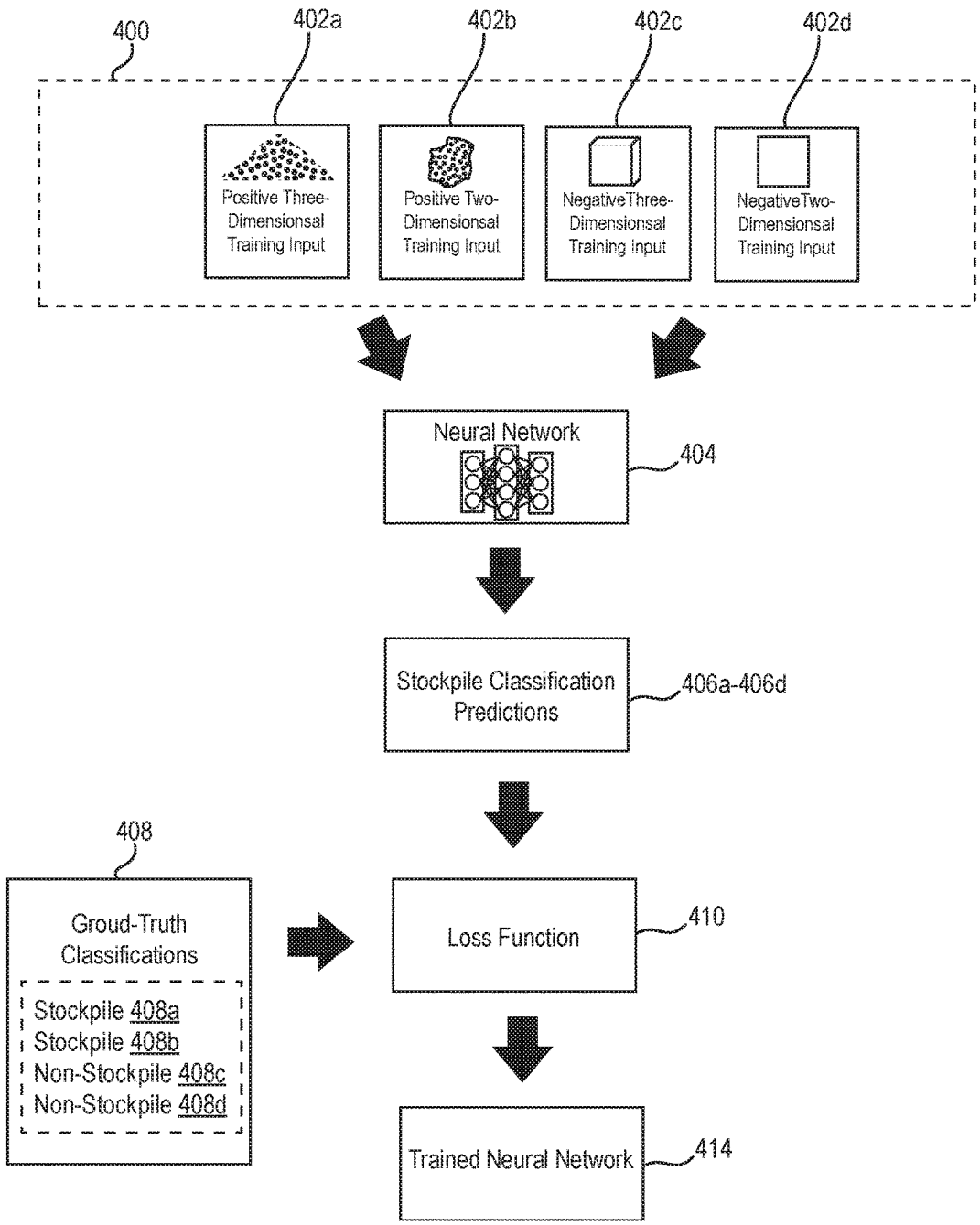
FIG. 4 illustrates a representation of training a neural network utilizing two-dimensional inputs and three-dimensional inputs in accordance with one or more embodiments.

Turning now to FIG. 4, additional detail will be provided regarding training a neural network (e.g., the neural network 220) to classify stockpiles in accordance with one or more embodiments. In particular, FIG. 4 illustrates training a neural network 404 with training inputs 400 to classify stockpiles based on two-dimensional training inputs and three-dimensional training inputs.

For example, FIG. 4 illustrates a positive three-dimensional training input 402a (e.g., a three-dimensional input of a stockpile), a positive two-dimensional training input 402b (e.g., a two-dimensional input of a stockpile), a negative three-dimensional training input 402c (e.g., a three-dimensional input of a non-stockpile, such as a building), and a negative two-dimensional training input 402d (e.g., a two-dimensional input of a non-stockpile, such as a building). As shown, the aerial stockpile analysis system utilizes the training inputs 402a-402d together ground-truth classifications 408a-408d corresponding to the training inputs 402a-402d to generate a trained neural network 414.

Although FIG. 4 illustrates individual training inputs 402a-402d, in one or more embodiments, the aerial stockpile analysis system utilizes pairs of two-dimensional training inputs and three-dimensional training inputs to train a neural network. Specifically, the aerial stockpile analysis system can utilize a two-dimensional training input and a three-dimensional training input that correspond to the same object. Thus, in relation to FIG. 4, the aerial stockpile analysis system utilizes the positive three-dimensional training input 402a and the positive three-dimensional training input 402b that reflect the same stockpile. Similarly, the aerial stockpile analysis system utilizes the negative three-dimensional training input 402c and the negative two-dimensional training input 402d that reflect the same object (e.g., a building). In this manner, the aerial stockpile analysis system can teach the neural network 404 to identify significant features across two-dimensional and three-dimensional inputs.

As shown, the aerial stockpile analysis system provides the training inputs 402a-402d to the neural network 404, and the neural network 404 generates stockpile classification predictions 406a-406d. In particular, the neural network 404 predicts a classification (e.g., stockpile or non-stockpile) for each of the training inputs 402a-402d. For example, the neural network 404 can predict that the positive three-dimensional training input 402a corresponds to a stockpile.

As just mentioned, in one or more embodiments, the aerial stockpile analysis system provides the training inputs as training input pairs (rather than individual training inputs). Thus, rather than predicting a classification for each of the individual training inputs 402a-402d, in one or more embodiments, the aerial stockpile analysis system utilizes the neural network 404 to predict a stockpile classification for each training input pair. To illustrate, the aerial stockpile analysis system can generate a single combined prediction for the positive three-dimensional training input 402a and the positive two-dimensional training input 402b. Similarly, the aerial stockpile analysis system can generate another combined prediction for the negative three-dimensional training input 402c and the negative two-dimensional training input 402d.

The aerial stockpile analysis system can train the neural network 404 by comparing the stockpile classification predictions 406a-406d and the ground-truth classifications 408a-408d. In particular, as shown in FIG. 4, the aerial stockpile analysis system can utilize a loss function 410 to compare the stockpile classification predictions 406a-406d and the ground-truth classifications 408a-408d. The loss function 410 determines differences between the stockpile classification predictions 406a-406d and the ground-truth classifications 408a-408d. For example, the loss function 410 can generate a loss measure for each predicted classification that differs from the corresponding ground-truth classification.

As shown in FIG. 4, the aerial stockpile analysis system can then utilize the loss function 410 to generate the trained neural network 414. In particular, the aerial stockpile analysis system can provide the loss function 410 to the neural network 404 and the neural network 404 can learn to identify attributes that result in accurate stockpile classifications. More specifically, the aerial stockpile analysis system can identify attributes that accurately predict stockpile classifications, reduce the difference between the stockpile classification predictions 406a-406d and the ground-truth classifications 408a-408d, and minimize the loss function 410. In this manner, the aerial stockpile analysis system can generate the trained neural network 414 (i.e., the neural network 220).

Although FIG. 4 illustrates generating the trained neural network 414 utilizing both positive and negative training inputs, the aerial stockpile analysis system can also train a neural network utilizing only positive training inputs. In one or more embodiments, however, the aerial stockpile analysis system utilizes both positive and negative training inputs to increase accuracy and reduce the amount of time to generate the trained neural network 414. Indeed, by calculating the loss function 410 based on both positive training inputs and negative training inputs, the aerial stockpile analysis system can train the neural network 404 to not only quickly and accurately classify stockpiles but to quickly and accurately classify non-stockpile objects (such as cars, buildings, etc.).

In addition, although the positive training inputs 402a, 402b illustrate whole stockpiles, in one or more embodiments, the aerial stockpile analysis system also trains the neural network 404 utilizing portions of stockpiles. For example, the aerial stockpile analysis system can utilize positive training inputs 402a, 402b that reflect a first portion of a stockpile having a first material (e.g., as discussed above in relation to FIG. 3). Thus, the aerial stockpile analysis system can train the neural network 404 to classify a portion of a stockpile (e.g., half of a stockpile of a first material).

As discussed above, the training inputs 402a-402d can take a variety of forms. In one or more embodiments, the training inputs 402a-402d comprise two-dimensional representations and three-dimensional representations. In other embodiments, the training inputs 402a-402d comprise features extracted from two-dimensional representations and three-dimensional representations. For example, the aerial stockpile analysis system can extract two-dimensional features from a two-dimensional representation and provide the two-dimensional features to the neural network 404 to generate the trained neural network 414. To illustrate, the aerial stockpile analysis system can train the neural network 404 by providing two-dimensional features that include shape (e.g., an exterior shape of an overhead view of a training stockpile), area, perimeter (e.g., length of the perimeter around a training stockpile), width, length, circularity (e.g., a measure of how close a two-dimensional overhead view of a training stockpile is to a circular shape), color (e.g., a single color, color gradation, color histogram, or color profile), or texture.

Similarly, the aerial stockpile analysis system can also extract three-dimensional features from a three-dimensional representation and provide the three-dimensional features to the neural network 404 to generate the trained neural network 414. To illustrate, the aerial stockpile analysis system can train the neural network 404 by providing three-dimensional features that include slope (e.g., slope along one or more surfaces of a three-dimensional stockpile representation), elevation profile (e.g., a profile shape generated from a three-dimensional stockpile representation), height (e.g., maximum height or average height), volume, or surface coarseness (e.g., a measure of variation in surface elevation that indicate a smooth or jagged surface).

Furthermore, although FIG. 4 illustrates only four training inputs 402a-402d, the aerial stockpile analysis system can generate and utilize any number of training inputs. Indeed, in one or more embodiments, the aerial stockpile analysis system utilizes thousands of training inputs from a repository of training inputs to train the neural network 404.

As mentioned above, in one or more embodiments, upon identifying one or more stockpiles from a three-dimensional site representation, the aerial stockpile analysis system determines a volume of the one or more identified stockpiles. In particular, the aerial stockpile analysis determines a ground reference surface from a stockpile boundary and then determines a volume based on the ground reference surface. For example, FIG. 5 illustrates determining a volume of a stockpile based on a ground reference surface.

Figure 5:
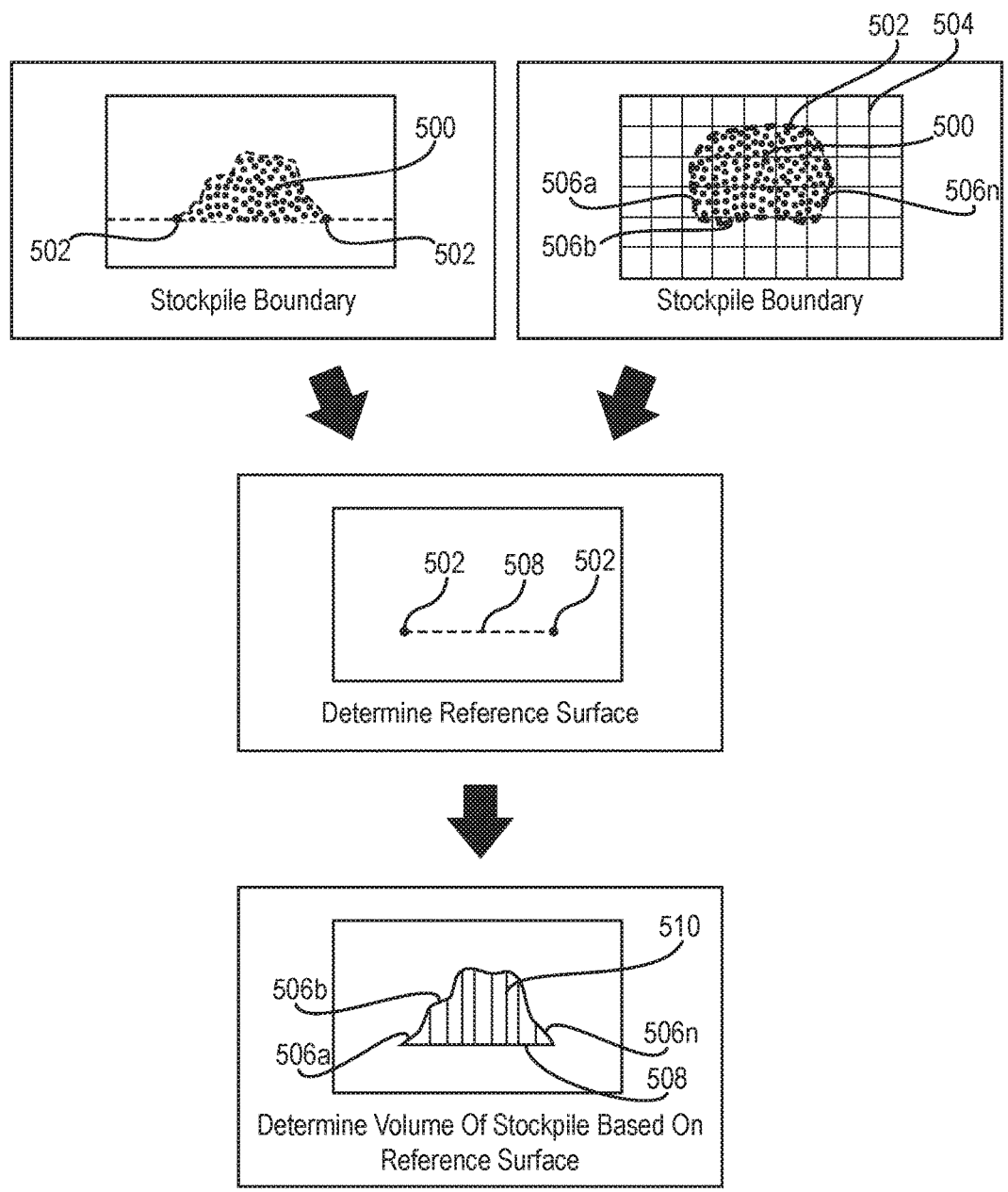
FIG. 5 illustrates a representation of determining a stockpile volume based on a ground reference surface in accordance with one or more embodiments.

In particular, FIG. 5 illustrates an aerial view and a profile view of a stockpile boundary 502. As shown, the stockpile boundary 502 comprises a plurality of points delineating the outer border of a stockpile 500 (i.e., the border between the stockpile material and the ground). In particular, the stockpile boundary 502 comprises a plurality of points of a three-dimensional point cloud defining the outer border the stockpile 500.

As shown in FIG. 5, the aerial stockpile analysis system utilizes the stockpile boundary 502 to determine a ground reference surface 508. In particular, in one or more embodiments, the aerial stockpile analysis system utilizes the three-dimensional coordinates of the boundary points to calculate the ground reference surface 508, which approximates the ground underlying the stockpile 500. Specifically, in one or more embodiments, the aerial stockpile analysis system generates the ground reference surface 508 by providing the three-dimensional coordinates of the boundary points to a RANSAC sampling algorithm. The RANSAC sampling algorithm generates a best fitting plane for the collection of points making up the stockpile boundary 502 to generate the ground reference surface 508.

Although the ground reference surface 508 appears as a horizontal plane in FIG. 5, the aerial stockpile analysis system can determine a ground reference surface that is a much more complex reference surface. Indeed, stockpile boundaries are often made up of boundary points that are not level. For example, a stockpile may rest on an incline (e.g., a hill or mountainside), or otherwise uneven ground (e.g., on an unpaved construction site). The aerial stockpile analysis system can generate a ground reference surface that approximates an underlying ground surface, even when the underlying ground surface is uneven.

Upon determining the ground reference surface 508, the aerial stockpile analysis system determines a volume 510 of the stockpile 500. In particular, the aerial stockpile analysis system can determine the difference between the stockpile 500 and the ground reference surface 508.

In one or more embodiments, the aerial stockpile analysis system determines a volume based on a resolution of a stockpile (e.g., a point cloud representing a stockpile). For example, in relation to FIG. 5, the aerial stockpile analysis system determines a resolution of the stockpile 500 (e.g., a density of points in a point cloud in an x and/or y direction). Moreover, the aerial stockpile analysis system maps the stockpile 500 into a two-dimensional grid 504 comprising a plurality of cells 506a-506n. The size of each cell 506a-506n is based on (e.g., equal to or a multiple of) the determined resolution.

As shown in FIG. 5, the aerial stockpile analysis system determines the volume of the stockpile 500 based on the cells 506a-506n. In particular, the aerial stockpile analysis system determines the height of each cell 506a-506n between the stockpile 500 and the ground reference surface 508. The aerial stockpile analysis system then determines the volume 510 of the stockpile 500 based on the area of each cell 506a-506n and the height of each cell 506a-506n (e.g., by multiplying the area of each cell times the height and adding the resulting values together). In this manner, the aerial stockpile analysis system can determine the volume of a stockpile based on a ground reference surface.

As mentioned above, in one or more embodiments, the aerial stockpile analysis system can also determine a change in volume of stockpiles over time. In particular, the aerial stockpile analysis system can identify and calculate a volume of stockpiles in relation to digital aerial images of a site captured at first point in time (e.g., during a first flight). The aerial stockpile analysis system can then obtain a plurality of digital aerial images of the site captured at a second point in time (e.g., during a second flight). The aerial stockpile analysis system can utilize the stockpiles identified at the first point in time to identify stockpiles and calculate volumes of the stockpiles at the second point in time. Moreover, the aerial stockpile analysis system can then determine a change in volume between the first point in time and the second point in time.

Figure 6:
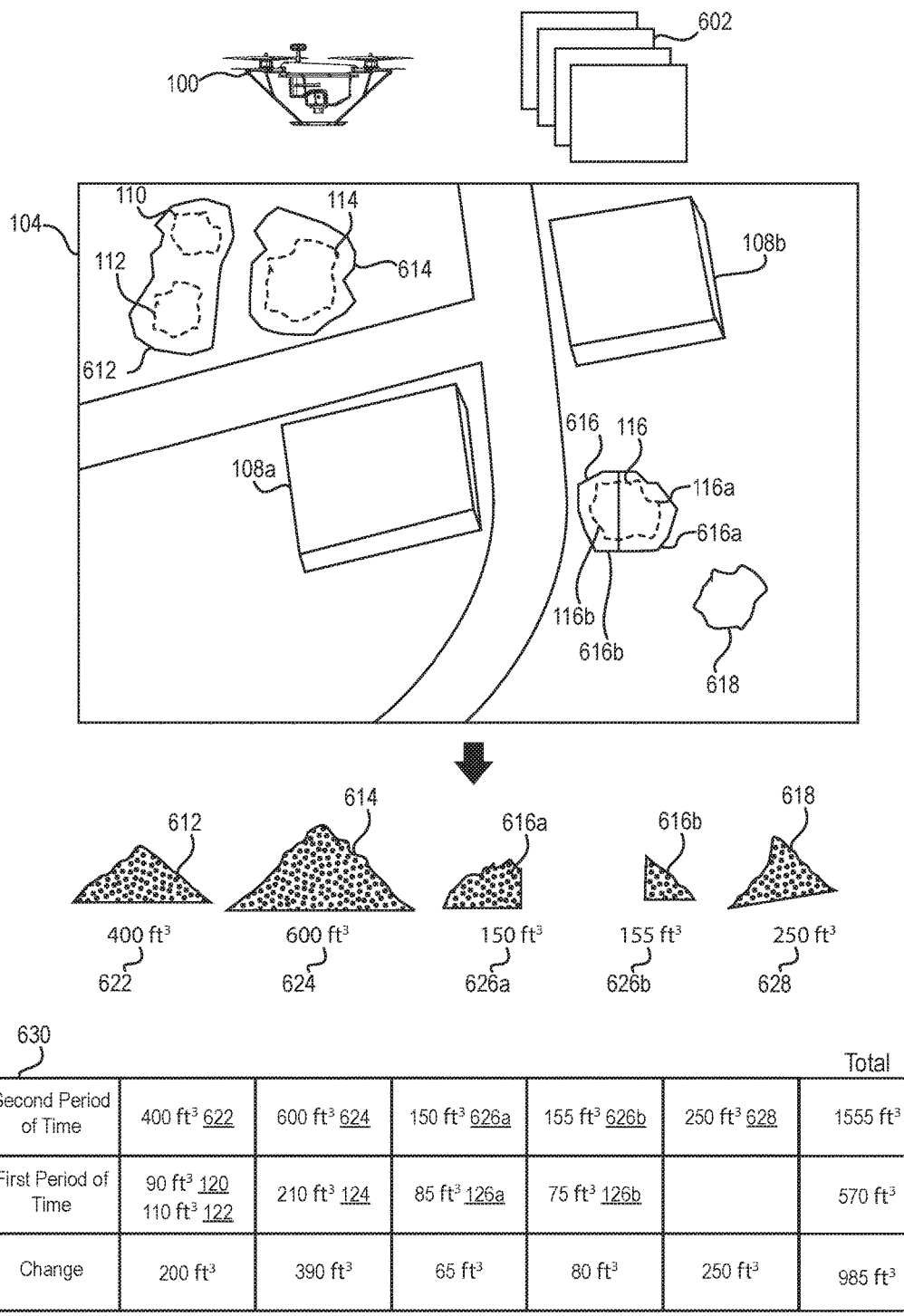
FIG. 6 illustrates a representation of determining stockpile volume over time in accordance with one or more embodiments.

For example, FIG. 6 illustrates the site 104 (from FIG. 1) at a second period of time. Moreover, FIG. 6 illustrates the UAV 100 capturing a second plurality of digital images 602 of the site 104 during a second flight conducted at the second period of time. As shown, the site 104 has changed between the first period of time (shown in FIG. 1) and the second period of time (shown in FIG. 6). In particular, the stockpiles 110 and 112 have grown into a single large stockpile 612. Moreover, the stockpiles 114, 116 have grown to stockpiles 614, 616 (with the first stockpile 116a of the first material growing to the first stockpile 616a and the second stockpile 116b of the second material growing to the second stockpile 616b). Furthermore, the site 104 includes a new stockpile 618.

The aerial stockpile analysis system can determine three-dimensional stockpile representations and volumes 622-628 corresponding to each of the stockpiles 612-618. For example, in one or more embodiments, the aerial stockpile analysis system repeats the process described in relation to FIGS. 2A-2C to determine the volumes of the stockpiles 612-618. In particular, the aerial stockpile analysis system generates a new two-dimensional representation of the site 104 and a new three-dimensional representation of the site 104 based on the second plurality of digital aerial images 602. Moreover, the aerial stockpile analysis system can apply an elevation filter to identify potential stockpiles and potential stockpile boundaries. The aerial stockpile analysis system can then utilize the potential stockpile boundaries and generate three-dimensional potential stockpile representations and two-dimensional potential stockpile representations. The aerial stockpile analysis system can then utilize the three-dimensional potential stockpile representations and the two-dimensional potential stockpile representations with a neural network to determine whether the potential stockpiles are the actual stockpiles 612-618. Moreover, the aerial stockpile analysis system can determine a boundary for each of the stockpiles 612-618, identify a ground reference surface for each of the stockpiles 612-618, and calculate the volumes 622-628 for each of the stockpiles 612-618 based on the three-dimensional stockpile representations of each identified stockpile and a corresponding ground reference surface.

Furthermore, the aerial stockpile analysis system can also apply a material classifier to identify and determine volumes for the first stockpile 616a and the second stockpile 616b. Specifically, the aerial stockpile analysis system can apply a material classifier to determine a boundary between the first stockpile 616a and the second stockpile 616b. The aerial stockpile analysis system can generate revised potential three-dimensional stockpile representations and revised potential two-dimensional stockpile representations for the first stockpile 616a and the second stockpile 616b. Further, the aerial stockpile analysis system can then utilize a neural network to determine that the revised potential three-dimensional stockpile representations and the revised potential two-dimensional stockpile representations reflect the first stockpile 616a and the second stockpile 616b. The aerial stockpile analysis system can then determine the volume of the first stockpile 616a and the second stockpile 616b.

As mentioned above, however, in one or more embodiments, the aerial stockpile analysis system utilizes the previously identified stockpiles 110-116 at the first point in time to identify the stockpiles 612-616 at the second point in time. For example, the aerial stockpile analysis system can utilize stockpile locations from a first point time to guide or emphasize application of an elevation filter (e.g., the elevation filter 212). In particular, the aerial stockpile analysis system can apply the elevation filter 212 based on the stockpile 114 at the first point in time to identify the stockpile 614 at the second point in time. To illustrate, the aerial stockpile analysis system can look for a highest point in a region based on the stockpile 114 (e.g., an area twice as large as the stockpile 114) and then identify a potential stockpile based on the highest point in that region.

Similarly, in one or more embodiments, the aerial stockpile analysis system can omit one or more steps based on a determination that a stockpile at a second point in time overlaps a region corresponding to a stockpile at a first point in time. For example, the aerial stockpile analysis system can utilize an elevation filter at the second point in time to identify potential stockpiles from the second plurality of digital aerial images 602. The aerial stockpile analysis system can then determine the potential stockpiles at the second point in time overlap the original stockpiles 110-116 at the first point in time. For the potential stockpile locations that overlap the original stockpiles 110-116, the aerial stockpile analysis system can omit one or more steps to streamline identification of the stockpiles and determination of stockpile volume.

To illustrate, upon determining that the stockpile 612 overlaps the stockpiles 110, 112 on the site 104, the aerial stockpile analysis system can proceed to determine a volume of the stockpile 612 (i.e., without applying a neural network to confirm that that it is an actual stockpile). More particularly, based on a determination that a potential stockpile location at a second point in time overlaps a stockpile at a first point in time, the aerial stockpile analysis system can omit application of a neural network (e.g., the neural network 220). Thus, the aerial stockpile analysis system can utilize the stockpiles 110-116 from the first point in time to identify the stockpiles 612-616 at the second point in time and determine the volumes 622-626 of the stockpiles 612-616 at the second point in time.

As shown in FIG. 6, the aerial stockpile analysis system can also identify new stockpiles at a second point in time that did not exist at a first point in time. For instance, in relation to the stockpile 618, the aerial stockpile analysis system can apply an elevation filter to identify a potential stockpile location corresponding to the stockpile 618. The aerial stockpile analysis system can also determine that the potential stockpile location does not overlap a previously identified stockpile. In response to the determination that potential stockpile is new (i.e., does not overlap a previously identified stockpile), the aerial stockpile analysis system can apply a neural network (e.g., the neural network 220) to confirm that the potential stockpile is actually the stockpile 618. The aerial stockpile analysis system can then determine a boundary of the stockpile 618, identify a ground reference surface based on the boundary, and calculate a volume 628 of the stockpile 618 based on the ground reference surface and a three-dimensional stockpile representation.

Thus, as shown, the aerial stockpile analysis system determines volumes of the stockpiles 612-618 at the second point in time. Moreover, the aerial stockpile analysis system determines a change in volume between the first point in time and the second point in time. For example, as shown in FIG. 6, the aerial stockpile analysis system calculates the volumes 622-628 for each of the stockpiles 612-618. Moreover, the aerial stockpile analysis system determines a correspondence between the stockpiles 612-618 and the stockpiles 110-116 (e.g., that the stockpiles 110, 112 overlap the stockpile 612, that the stockpile 114 overlaps the stockpile 614, that the first stockpile 116a overlaps the first stockpile 616a, and that the second stockpile 116b overlaps the second stockpile 616b). Based on the determined correspondence, the aerial stockpile analysis system determines a change in volume (i.e., increase or decrease in volume) between the first point in time and the second point in time for each of the stockpiles. Moreover, as illustrated in the table 630 the aerial stockpile analysis system determines a total change in volume for all stockpiles on the site 104 between the first period of time and the second period of time.

Although FIG. 6 illustrates stockpiles that have increased in volume, the aerial stockpile analysis system can also analyze and determine volume changes for stockpiles that have decreased in volume. Moreover, the aerial stockpile analysis system can also analyze and determine volume changes for stockpiles that have been removed. Thus, for example, the aerial stockpile analysis system can determine a total (or partial) negative change in stockpiles on a site between a first period of time and a second period of time.

In one or more embodiments, the aerial stockpile analysis system can also provide changes in stockpile volume for display to a user via a computing device. For example, the aerial stockpile analysis system can provide the table 630 for display via a display screen of computing device, allowing a user to see how volume of stockpiles on a site changes over time. Similarly, the aerial stockpile analysis system can also provide a three-dimensional site representation (e.g., three-dimensional rendering) or a two-dimensional site representation (e.g., a map) that illustrates the size of stockpiles over time (e.g., as shown in relation to the stockpiles 110-116 and 612-618 of FIG. 6). Moreover, the aerial stockpile analysis system can also provide three-dimensional stockpile representations or two-dimensional stockpile representations over different periods of time for display via a computing device.

Figure 7:
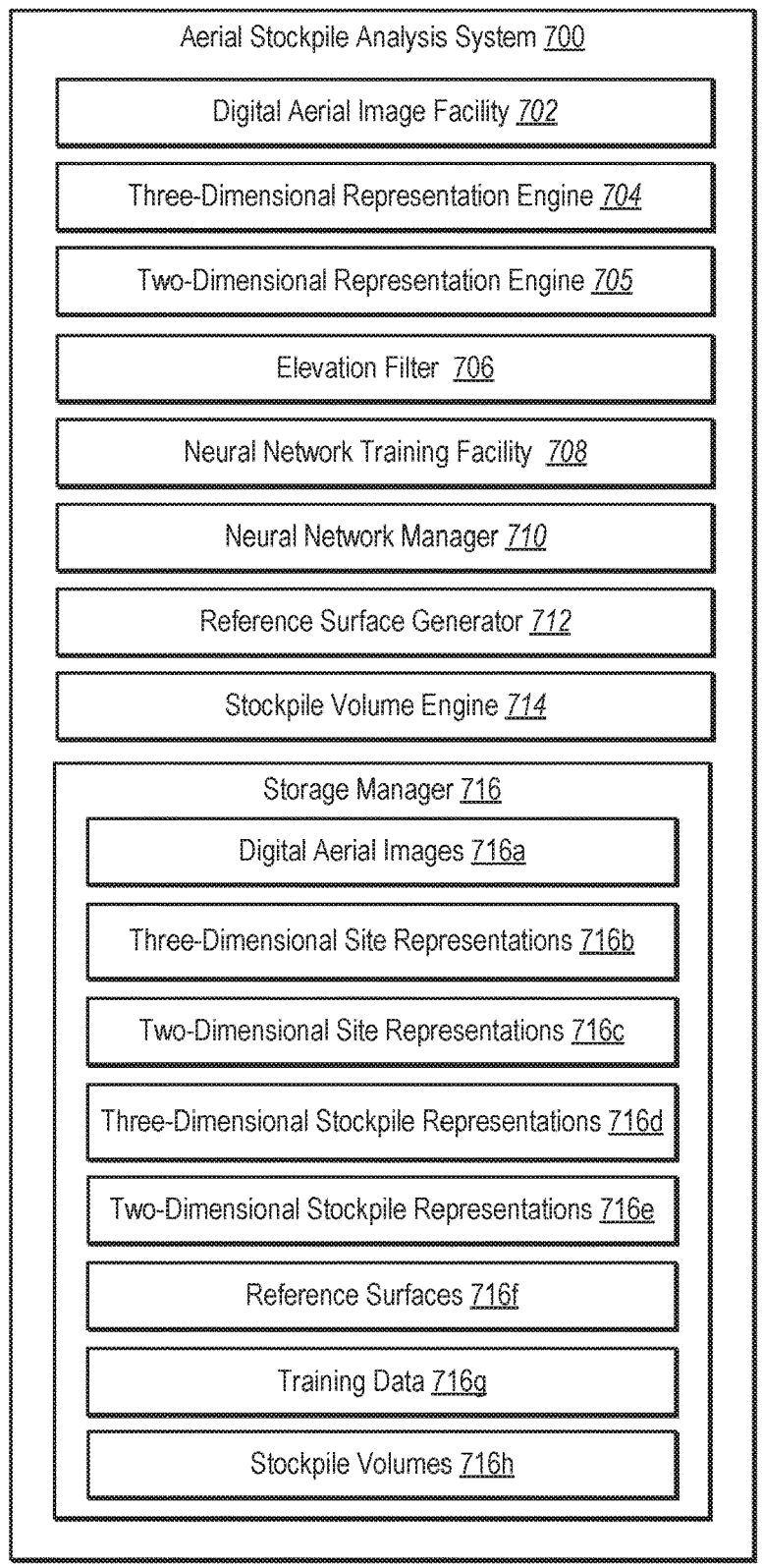
FIG. 7 illustrates a schematic diagram of an aerial stockpile analysis system in accordance with one or more embodiments.

Turning now to FIG. 7, additional detail will be provided regarding components and capabilities of one or more embodiments of the aerial stockpile analysis system. In particular, FIG. 7 shows a schematic diagram illustrating an example embodiment of an aerial stockpile analysis system 700 (e.g., the aerial stockpile analysis system discussed above). As shown in FIG. 7, in one or more embodiments, the aerial stockpile analysis system 700 includes a digital aerial image facility 702, a three-dimensional representation engine 704, a two-dimensional representation engine 705, an elevation filter 706, a neural network training facility 708, a neural network manager 710, a reference surface generator 712, a stockpile volume engine 714, and a storage manager 716 (comprising digital aerial images 716a, three-dimensional site representations 716b, two-dimensional site representations 716c, three-dimensional stockpile representations 716d, two-dimensional stockpile representations 716e, reference surfaces 716f, training data 716g, and stockpile volumes 716h).

As just mentioned, and as illustrated in FIG. 7, the aerial stockpile analysis system 700 includes the digital aerial image facility 702. The digital aerial image facility 702 can obtain, capture, receive, and/or identify digital aerial images. For instance, the digital aerial image facility 702 can capture or receive (e.g., via a UAV) digital aerial images of a site. More particularly, the digital aerial image facility 702 can receive digital aerial images of a site portraying stockpiles located on the site.

Moreover, as shown in FIG. 7, the aerial stockpile analysis system 700 includes the three-dimensional representation engine 704. The three-dimensional representation engine 704 can generate, create, and/or determine a three-dimensional representation from a plurality of digital aerial images. In particular, the three-dimensional representation engine 704 can generate a three-dimensional site representation and/or a three-dimensional stockpile representation from a plurality of digital aerial images. For instance, as described above, the three-dimensional representation engine 704 can generate a three-dimensional site representation from a plurality of digital images utilizing a structure from motion and/or bundle adjustment algorithm.

Moreover, as shown in FIG. 7, the aerial stockpile analysis system 700 includes the two-dimensional representation engine 705. The two-dimensional representation engine 705 can generate, create, and/or determine a two-dimensional representation from a plurality of digital aerial images (and/or from a three-dimensional representation). In particular, the two-dimensional representation engine 705 can generate a two-dimensional site representation and/or a two-dimensional stockpile representation from a plurality of digital aerial images (and/or from a three-dimensional representation of a site). For instance, as described above, the two-dimensional representation engine 705 can generate an orthophoto from a plurality of digital images utilizing a structure from motion and/or bundle adjustment algorithm.

In addition, as illustrated in FIG. 7, the aerial stockpile analysis system 700 includes the elevation filter 706. The elevation filter 706 can identify, generate, determine, and/or isolate one or more stockpiles from a three-dimensional site representation. In particular, the elevation filter 706 can filter non-ground objects (such as cars, structures, individuals, or equipment) from a three-dimensional site representation by analyzing elevation data from the three-dimensional site representation. For example, as described above, the elevation filter 706 can analyze a three-dimensional site representation and remove non-ground objects (e.g., non-ground objects erroneously identified as potential stockpile locations).

In addition, as discussed above, the elevation filter 706 can analyze a three-dimensional site representation to identify stockpiles (or potential stockpiles). For example, as discussed above, the elevation filter 706 can identify a highest point in a three-dimensional site representation (or filtered three-dimensional site representation) and then add points from the three-dimensional site representation to identify a potential stockpile.

As shown in FIG. 7, in addition to the elevation filter 706, the aerial stockpile analysis system 700 also includes the neural network training facility 708. The neural network training facility 708 can train, teach, instruct, or program one or more neural networks. In particular, the neural network training facility 708 can train a neural network to classify stockpiles based on two-dimensional training input and/or three-dimensional training input. Moreover, the neural network training facility 708 can also train a material classifier (in relation to embodiments that utilize a material classifier to identify materials and/or material boundaries).

For example, the aerial stockpile analysis system can train a neural network utilizing positive training two-dimensional representations, positive training three-dimensional representations, negative training two-dimensional representations, and/or negative training three-dimensional representations to classify stockpiles. Moreover, the aerial stockpile analysis system can train a neural network utilizing training two-dimensional inputs (e.g., two-dimensional representations portraying different materials) to identify materials and/or material boundaries within a stockpile.

As shown in FIG. 7, the aerial stockpile analysis system 700 also includes the neural network manager 710. The neural network manager 710 can utilize and/or apply a neural network (e.g., one or more neural networks trained via the neural network training facility 708). In particular, the neural network manager 710 can apply a neural network to a two-dimensional stockpile representation and/or a three-dimensional stockpile representation to classify a potential stockpile. Similarly, the neural network manager 710 can apply a neural network to a two-dimensional representation to identify multiple materials and/or material boundaries within a stockpile.

Moreover, as shown in FIG. 7, the aerial stockpile analysis system 700 also includes the reference surface generator 712. The reference surface generator 712 can determine, identify, calculate, or approximate one or more reference surfaces. In particular, the reference surface generator 712 can determine a ground reference surface underlying a stockpile based on a stockpile boundary. In particular, the reference surface generator 712 can include a segmentation algorithm that identifies a boundary of a stockpile from a three-dimensional site representation. Moreover, the reference surface generator 712 can utilize a RANSAC sampling algorithm to generate a ground reference surface from a stockpile boundary.

As illustrated in FIG. 7, the aerial stockpile analysis system 700 also includes the stockpile volume engine 714. The stockpile volume engine 714 can determine, calculate, estimate, or identify one or more volumes of one or more stockpiles. In particular, the stockpile volume engine 714 can generate a grid of cells based on a resolution of a three-dimensional site representation and overlay the grid of cells on a three-dimensional stockpile representation. The stockpile volume engine 714 can then determine a height of each cell based on the three-dimensional stockpile representation and a ground reference surface. Based on the height and area of each cell, the aerial stockpile analysis system can determine a volume of a stockpile.

Moreover, as illustrated in FIG. 7, the aerial stockpile analysis system 700 also includes the storage manager 716. The storage manager 716 maintains data for the aerial stockpile analysis system 700. The storage manager 716 can maintain data of any type, size, or kind, as necessary to perform the functions of the aerial stockpile analysis system 700. For instance, as shown in FIG. 7, the storage manager 716 includes digital aerial images 716a (e.g., a plurality of digital aerial images of a plurality of sites captured at a plurality of times), three-dimensional site representations 716b (e.g., three-dimensional site representations corresponding to a plurality of sites), two-dimensional site representations 716c (e.g., two-dimensional site representations corresponding to a plurality of sites), three-dimensional stockpile representations 716d (e.g., three-dimensional representations of potential or final stockpiles), two-dimensional stockpile representations 716e (e.g., two-dimensional representations of potential or final stockpiles), reference surfaces 716f (e.g., ground reference surfaces reflecting the ground underlying one or more stockpiles), training data 716g (e.g., three-dimensional training representations or two-dimensional training representations), and stockpile volumes 716h (e.g., volumes of stockpiles and/or materials on a site).

Each of the components 702-716 of the aerial stockpile analysis system 700 and their corresponding elements may be in communication with one another using any suitable communication technologies. It will be recognized that although components 702-716 are shown to be separate in FIG. 7, any of components 702-716 may be combined into fewer components (such as into a single component), divided into more components, or configured into different components as may serve a particular embodiment. Moreover, one or more embodiments of the aerial stockpile analysis system 700 may include additional components or fewer components than those illustrated in FIG. 7.

The components 702-716 and their corresponding elements can comprise software, hardware, or both. For example, the components 702-716 and their corresponding elements can comprise one or more instructions stored on a computer-readable storage medium and executable by processors of one or more computing devices. When executed by the one or more processors, the computer-executable instructions of the aerial stockpile analysis system 700 can cause one or more computing systems (e.g., one or more server devices) to perform the methods and provide the functionality described herein. Alternatively, the components 702-716 can comprise hardware, such as a special purpose processing device to perform a certain function or group of functions. Moreover, the components 702-716 can comprise a combination of computer-executable instructions and hardware.

Furthermore, the components 702-716 of the aerial stockpile analysis system 700 and their corresponding elements may, for example, be implemented as one or more stand-alone applications, as one or more modules of an application, as one or more plug-ins, as one or more library functions or functions that may be called by other applications, and/or as a cloud-computing model. Thus, components 702-716 of the aerial stockpile analysis system 700 and their corresponding elements may be implemented as one or more stand-alone applications, such as a desktop or mobile application. Furthermore, the components 702-716 of the aerial stockpile analysis system 700 may be implemented as one or more web-based applications hosted on a remote server. Moreover, the components of the aerial stockpile analysis system 700 may be implemented in a suite of mobile device applications or "apps."

Figure 8:
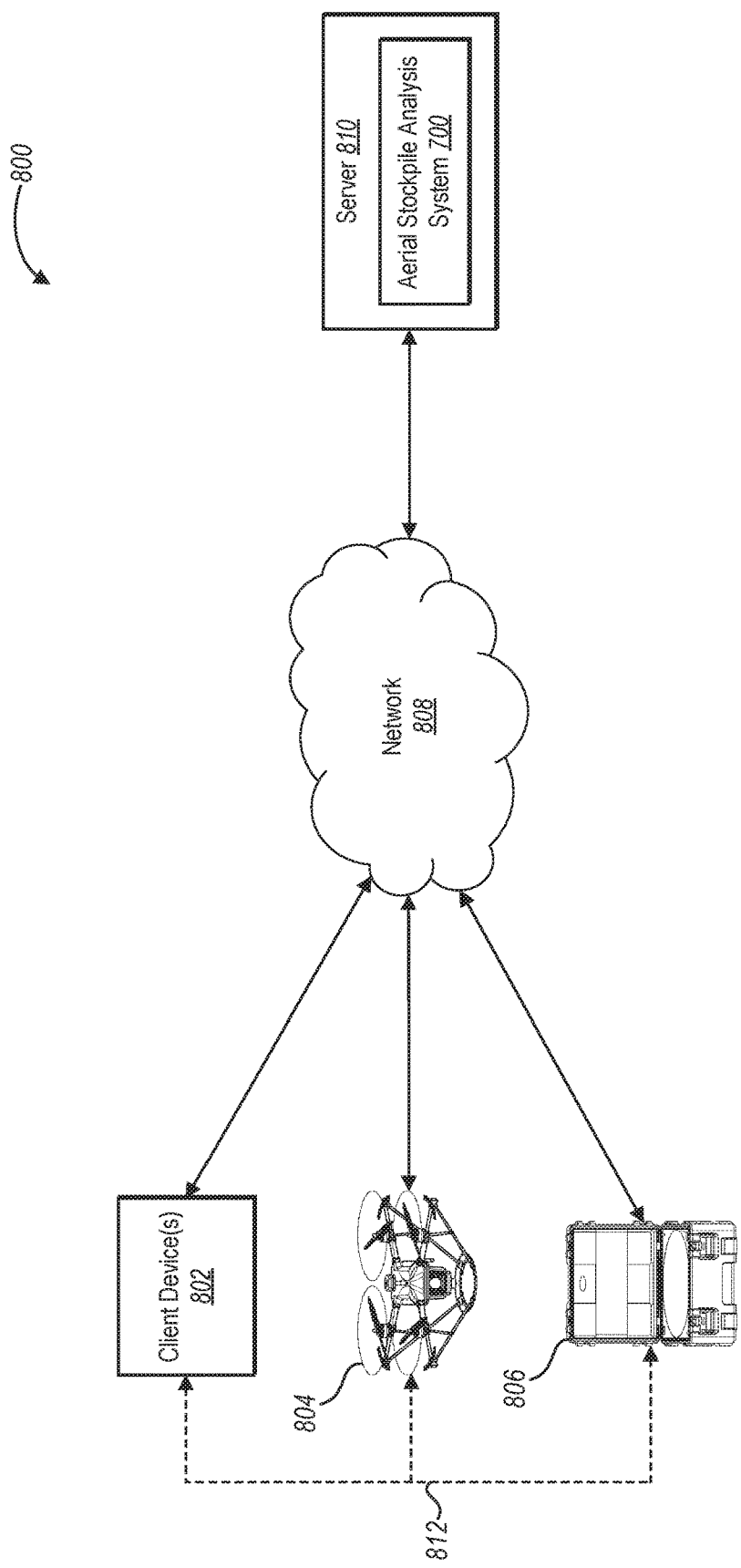
FIG. 8 illustrates a schematic diagram of a network environment in which the methods and systems disclosed herein may be implemented in accordance with one or more embodiments.

Turning now to FIG. 8, further information will be provided regarding implementation of the aerial stockpile analysis system 700. Specifically, FIG. 8 illustrates a schematic diagram of one embodiment of an exemplary system environment ("environment") 800 in which the aerial stockpile analysis system 700 can operate. As illustrated in FIG. 8, the environment 800 can include client devices(s) 802, a UAV 804, a docking station 806, a network 808, and server(s) 810. The client device(s) 802, the UAV 804, the docking station 806, the network 808, and/or the server(s) 810 may be communicatively coupled with each other either directly or indirectly. The client device(s) 802, the UAV 804, the docking station 806, the network 808, and the server(s) 810 may communicate using any communication platforms and technologies suitable for transporting data and/or communication signals, including any known communication technologies, devices, media, and protocols supportive of remote data communications, examples of which will be described in more detail below with respect to FIG. 11.

As just mentioned, and as illustrated in FIG. 8, the environment 800 can include the client device(s) 802. The client device(s) 802 may comprise any type of computing device. For example, the client device(s) 802 may comprise one or more personal computers, laptop computers, mobile devices, mobile phones, tablets, special purpose computers, TVs, or other computing devices. In one or more embodiments, the client device(s) 802 may comprise computing devices capable of communicating with the UAV 804, the docking station 806, and/or the server(s) 810. More specifically, in one or more embodiments, a pilot may utilize the client device(s) 802 to locally control and/or communicate with the UAV 804. The client device(s) 802 may comprise one or more computing devices as discussed in greater detail below with regard to FIG. 11.

Moreover, FIG. 8 also illustrates that the environment 800 can include the UAV 804, which represents one example embodiment of the UAV 100 or the UAV 200. As described above, the UAV 804 can comprise any type of unmanned aerial vehicle. Moreover, the UAV 804 can include a camera capable of capturing digital aerial images. In at least one embodiment, the UAV 804 is a multi-rotor vehicle, such as a quadcopter, and includes a carbon fiber shell, integrated electronics, a battery bay, a global positioning system ("GPS") receiver, a fixed or swappable imaging system (e.g., a digital camera), and various additional sensors and/or receivers. The UAV 804 may contain one or more computer-readable storage media and/or one or more processors with instructions stored thereon that, when executed by the one or more processors cause the UAV 804 to perform functions described herein.

As shown in FIG. 8, the environment 800 may include the docking station 806. The docking station 806 may be utilized to land, store, charge, guide, or repair the UAV 804. In particular, in one or more embodiments, the docking station 806 can charge or replace batteries exhausted by the UAV 804 during flight. Moreover, the docking station 806 may be utilized to communicate with the UAV 804 prior to, during, or after a flight.

As illustrated in FIG. 8, the client device(s) 802, the UAV 804, the docking station 806, and/or the server(s) 810 may communicate via the network 808. The network 808 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 808 may be any suitable network over which the client device(s) 802 (or other components) may access the server(s) 810 or vice versa. The network 808 will be discussed in more detail below with regard to FIG. 11.

Moreover, as illustrated in FIG. 8, the environment 800 also includes the server(s) 810. The server(s) 810 may generate, store, receive, and/or transmit any type of data, including digital aerial images 716*a*, three-dimensional site representations 716*b*, two-dimensional site representations 716*c*, three-dimensional stockpile representations 716*d*, two-dimensional stockpile representations 716*e*, reference surfaces 716*f*, training data 716*g*, and stockpile volumes 716*h*. For example, the server(s) 810 can receive data from the client device(s) 802 and send the data to the UAV 804, and/or the docking station 806. In one example embodiment, the server(s) 810 comprise a data server. The server(s) 810 can also comprise a communication server or a web-hosting server. Additional details regarding the server(s) 810 will be discussed below with respect to FIG. 10.

Although FIG. 8 illustrates client device(s) 802, the single UAV 804, and the single docking station 806, it will be appreciated that the client device(s) 802, the UAV 804, and the docking station 806 can represent any number of computing devices, UAVs, or docking stations (fewer or greater than shown). Similarly, although FIG. 8 illustrates a particular arrangement of the client device(s) 802, the UAV 804, the docking station 806, the network 808, and the server(s) 810 various additional arrangements are possible.

For example, the client device(s) 802, the UAV 804 and/or the docking station 806 may communicate directly one with another via a local connection 812. The local connection 812 may comprise any recognized form of wired or wireless communication. For example, in one or more embodiments the client device(s) 802 may include a mobile computing device (e.g., tablet) utilized by a UAV operator to communicate with the UAV 804 and the docking station 806 using BLUETOOTH technology.

By way of an additional example, in one or more embodiments, the UAV 804 captures (at a first period of time such as a first flight) a plurality of digital aerial images of a site (e.g., via the digital aerial image facility 702). Moreover, the UAV 804 transmits the plurality of digital aerial images of the site to the server(s) 810 (e.g., via the docking station 806 and/or the client device(s) 802). The server(s) 810 analyze the plurality of digital aerial images and predict volumes of stockpiles portrayed in the plurality of digital aerial images. In particular, the server(s) 810 generate a two-dimensional representation of the site and a three-dimensional representation of the site (e.g., via the three-dimensional representation engine 704 and the two-dimensional representation engine 705) from the plurality of digital aerial images. Moreover, the server(s) 810 apply an elevation filter (e.g., the elevation filter 706) to identify potential stockpiles (and/or stockpile boundaries). Further, the server(s) 810 apply a neural network trained to classify the potential stockpiles (e.g., via the neural network manager 710). The server(s) 810 then utilize three-dimensional models of the identified stockpiles to determine volumes of the stockpiles (e.g., via the reference surface generator 712 and the stockpile volume engine 714).

Furthermore, at a second period of time, the UAV 804 can capture a second plurality of digital aerial images of the site. The UAV 804 can transmit the second plurality of digital aerial images of the site to the server(s) 810. Moreover, the server(s) 810 can estimate the volumes of the stockpiles at the second period of time. Further, the server(s) 810 can determine changes in the volumes of the stockpiles between the first period of time and the second period of time by comparing the volumes of the stockpiles at the first period of time and the volumes of the stockpiles at the second period of time.

Moreover, in one or more embodiments, the server(s) 810 also train the neural network. For example, the server(s) 810 can train the neural network utilizing a plurality of two-dimensional training inputs and three-dimensional training inputs (e.g., via the neural network training facility 708). Furthermore, the server(s) 810 can train a material classifier utilizing a plurality of training models (e.g., via the neural network training facility 708).

As illustrated by the previous example embodiments, the aerial stockpile analysis system 700 may be implemented in whole, or in part, by the individual elements 802-810 of the environment 800. Although the previous examples describe certain components of the aerial stockpile analysis system 700 implemented with regard to certain elements of the environment 800, it will be appreciated that components of the aerial stockpile analysis system 700 can be implemented in any of the elements of the environment 800. For example, the aerial stockpile analysis system 700 may be implemented entirely on the UAV 804. Similarly, the aerial stockpile analysis system 700 may be implemented on the client device(s) 802, the docking station 806, and/or the server(s) 810. Moreover, different components and functions of the aerial stockpile analysis system 700 may be implemented separately among the client device(s) 802, the UAV 804, the docking station 806, the network 808, and the server(s) 810.

Figure 9:
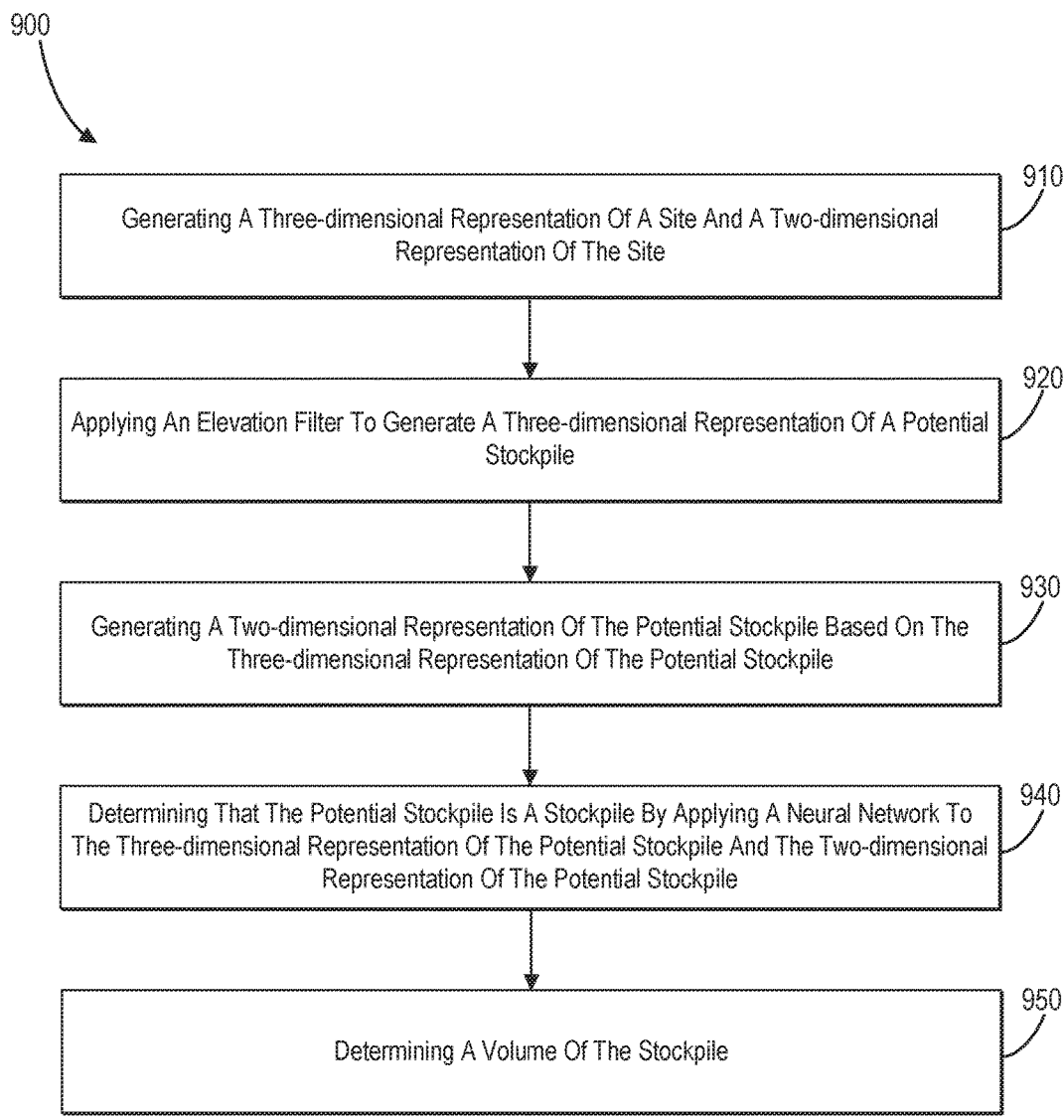
FIG. 9 illustrates a flowchart of a series of acts in a method of determining a stockpile volume utilizing digital aerial images captured by a UAV in accordance with one or more embodiments.

FIGS. 1-8, the corresponding text, and the examples, provide a number of different systems and devices for determining volume of stockpiles utilizing a plurality of digital aerial images. In addition to the foregoing, one or more embodiments can also be described in terms of flowcharts comprising acts and steps in a method for accomplishing a particular result. For example, FIG. 9 illustrates flowcharts of an exemplary method in accordance with one or more embodiments. The method described in relation to FIG. 9 may be performed with less or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart of one example method 900 of determining stockpile volumes utilizing a plurality of digital aerial images in accordance with one or more embodiments. As illustrated, the method 900 includes an act 910 of generating a three-dimensional representation of a site and a two-dimensional representation of the site. In particular, the act 910 can include utilizing a plurality of digital aerial images of a site captured by a UAV during a flight to generate a three-dimensional representation of the site and a two-dimensional representation of the site. For example, the act 910 can include utilizing a structure from motion algorithm and bundle adjustment algorithm to generate a three-dimensional representation of the site and a two-dimensional representation of the site. In one or more embodiments, the three-dimensional representation of the site comprises a three-dimensional point cloud and the two-dimensional representation of the site comprises a two-dimensional orthophoto.

As shown in FIG. 9, the method 900 also includes an act 920 of applying an elevation filter to generate a three-dimensional representation of a potential stockpile. In particular, the act 920 can include applying, by at least one processor, an elevation filter to the three-dimensional representation of the site to generate a three-dimensional representation of a potential stockpile on the site and a boundary of the potential stockpile. For example, the act 920 can include applying a ground return algorithm that identifies and removes non-ground objects from the three-dimensional representation to generate a filtered three-dimensional representation of the site. Moreover, in one or more embodiments, the act 920 also includes identifying a highest point of the plurality of points from the filtered three-dimensional representation of the site; determining additional points within a radius of the highest point; and based on a determination that the additional points satisfy a threshold stockpile gradient relative to the highest point, utilizing the additional points to generate the three-dimensional representation of the potential stockpile. Furthermore, the act 920 can also include identifying a set of points in the three-dimensional representation of the site adjacent to the three-dimensional representation of the potential stockpile that do not satisfy the threshold stockpile gradient relative to the three-dimensional representation; and generating the boundary of the potential stockpile based on the identified set of points.

In addition, as illustrated in FIG. 9, the method 900 also includes an act 930 of generating a two-dimensional representation of the potential stockpile based on the three-dimensional representation of the potential stockpile. In particular, the act 930 can include generating a two-dimensional representation of the potential stockpile from the two-dimensional representation of the site based on the identified boundary of the potential stockpile. For example, the act 930 can include cropping the two-dimensional representation of the site based on the identified boundary of the potential stockpile to generate the two-dimensional representation of the stockpile.

Further, as shown in FIG. 9, the method 900 also includes an act 940 of determining that the potential stockpile is a stockpile by applying a neural network to the three-dimensional representation of the potential stockpile and the two-dimensional representation of the potential stockpile. In particular, the act 940 can include determining, by the at least one processor, that the potential stockpile is a stockpile by applying a neural network to the two-dimensional representation of the potential stockpile and the three-dimensional representation of the potential stockpile, wherein the neural network is trained to identify stockpiles from two-dimensional training inputs and three-dimensional training inputs. For example, the act 940 can include extracting two-dimensional features from the two-dimensional representation and extracting three-dimensional features from the three-dimensional representation and applying the neural network to the two-dimensional features and the three-dimensional features to determine if the potential stockpile is a stockpile As shown in FIG. 9, the method 900 also includes an act 950 of determining a volume of the stockpile. In particular, the act 950 can include determining, by the at least one processor, a volume of the stockpile based on the three-dimensional representation of the stockpile. For example, in one or more embodiments, the act 950 includes determining a ground reference surface based on the boundary of the potential stockpile; and calculating the volume of the stockpile by comparing the ground reference surface and the three-dimensional representation of the stockpile.

In one or more embodiments, the method 900 also includes applying a material classifier to the two-dimensional representation of the potential stockpile to identify a material boundary between a first material in the potential stockpile and a second material in the potential stockpile; and utilizing the three-dimensional representation of the potential stockpile and the material boundary between the first material and the second material to generate a three-dimensional representation of a first revised potential stockpile corresponding to the first material and a three-dimensional representation of a second revised potential stockpile corresponding to the second material. For example, in one or more embodiments, the material classifier comprises at least one of: a clustering algorithm that clusters portions of the two-dimensional representation based on color or a neural network trained to identify different materials in potential stockpiles based on training two-dimensional representations. Furthermore, the method 900 can also include generating a two-dimensional representation of the first revised potential stockpile corresponding to the first material based on the material boundary; and applying the neural network to the three-dimensional representation of the first revised potential stockpile and the two-dimensional representation of the first revised potential stockpile.

Moreover, in one or more embodiments, the method 900 also includes receiving a second plurality of digital aerial images of a site captured by one or more UAVs during a second flight; based on a known location of the stockpile from the plurality of digital aerial images, identifying the stockpile from the second plurality of digital aerial images captured during the second flight; generating a new three-dimensional representation of the stockpile from the second plurality of digital aerial images; and determining a change in volume of the stockpile based on the three-dimensional representation of the stockpile and the new three-dimensional representation of the stockpile.

Further, in one or more embodiments, the method 900 also includes training the neural network. For example, the method 900 can also include providing the neural network with a training two-dimensional representation and a training three-dimensional representation corresponding to a ground-truth stockpile classification; utilizing the neural network to predict a stockpile classification for the two-dimensional representation and the three-dimensional representation; and determining one or more loss functions by comparing the predicted stockpile classification and the ground-truth stockpile classification.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
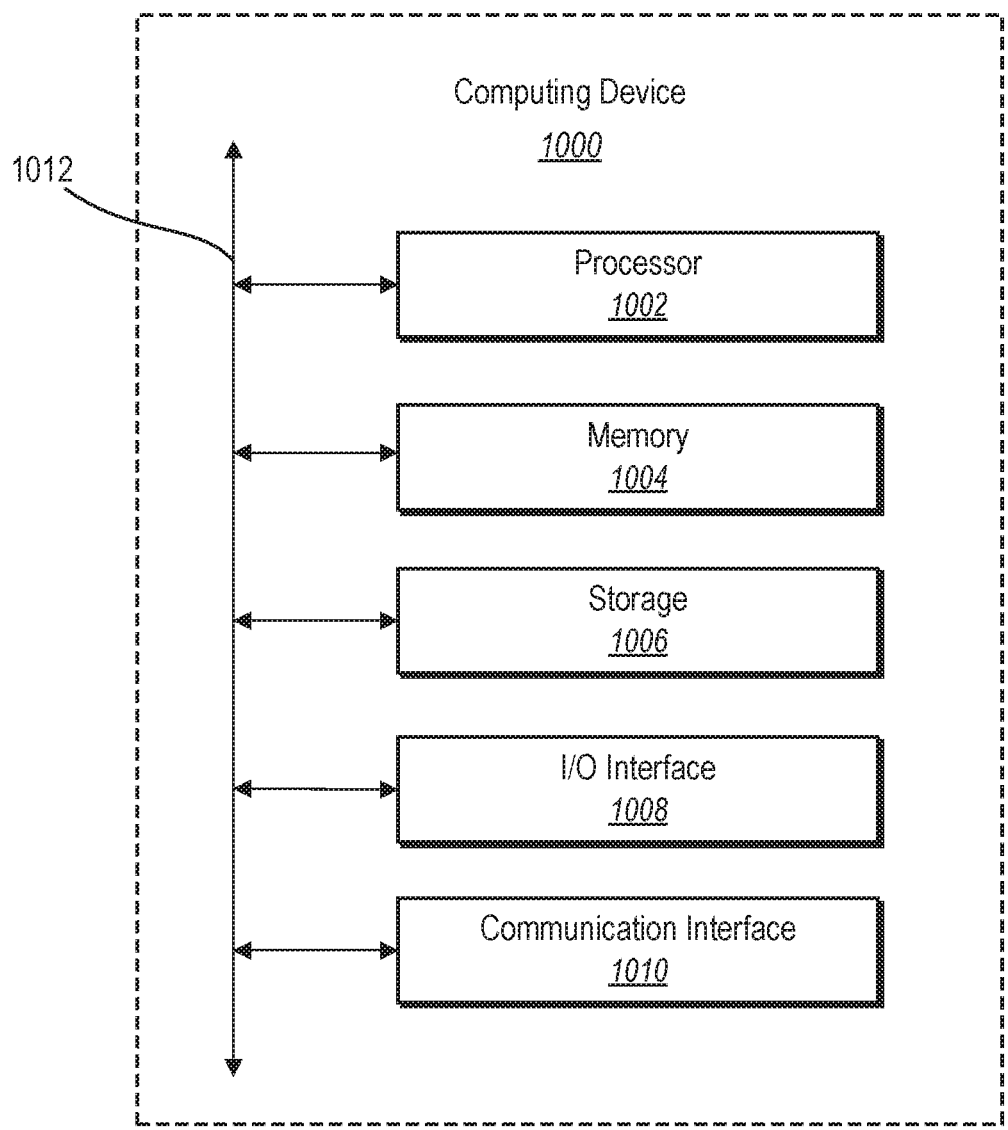
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that the aerial stockpile analysis system 700 can comprise implementations of the computing device 1000. As shown by FIG. 10, the computing device can comprise a processor 1002, memory 1004, a storage device 1006, an I/O interface 1008, and a communication interface 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example and not by way of limitation, storage device 1006 can comprise a non-transitory storage medium described above. The storage device 1006 may include a hard disk drive (HDD), flash memory, a Universal Serial Bus (USB) drive or a combination of these or other storage devices.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a stylus or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A method comprising:
   utilizing a plurality of digital aerial images of a site captured by a UAV during a flight to generate a three-dimensional representation of the site and a two-dimensional representation of the site;
   applying, by at least one processor, an elevation filter to the three-dimensional representation of the site to generate a three-dimensional representation of a potential stockpile on the site and a boundary of the potential stockpile;
   generating a two-dimensional representation of the potential stockpile from the two-dimensional representation of the site based on the boundary of the potential stockpile;
   determining, by the at least one processor, that the potential stockpile is a stockpile by applying a neural network to the two-dimensional representation of the potential stockpile and the three-dimensional representation of the potential stockpile, wherein the neural network is trained to identify stockpiles from two-dimensional training inputs and three-dimensional training inputs; and
   determining, by the at least one processor, a volume of the stockpile based on the three-dimensional representation of the stockpile.

2. The method of claim 1, wherein applying the elevation filter comprises applying a ground return algorithm that identifies and removes non-ground objects from the three-dimensional representation to generate a filtered three-dimensional representation of the site.

3. The method of claim 2, wherein the filtered three-dimensional representation of the site comprises a plurality of points and applying the elevation filter further comprises:
   identifying a highest point of the plurality of points from the filtered three-dimensional representation of the site;
   determining additional points within a radius of the highest point; and
   based on a determination that the additional points satisfy a threshold stockpile gradient relative to the highest point, utilizing the additional points to generate the three-dimensional representation of the potential stockpile.

4. The method of claim 3, wherein applying the elevation filter further comprises:
   identifying a set of points in the three-dimensional representation of the site adjacent to the three-dimensional representation of the potential stockpile that do not satisfy the threshold stockpile gradient relative to the three-dimensional representation; and generating the boundary of the potential stockpile based on the identified set of points.

5. The method of claim 1, further comprising:

applying a material classifier to the two-dimensional representation of the potential stockpile to identify a material boundary between a first material in the potential stockpile and a second material in the potential stockpile; and utilizing the three-dimensional representation of the potential stockpile and the material boundary between the first material and the second material to generate a three-dimensional representation of a first revised potential stockpile corresponding to the first material and a three-dimensional representation of a second revised potential stockpile corresponding to the second material.

6. The method of claim 5, wherein determining that the potential stockpile is the stockpile comprises:

generating a two-dimensional representation of the first revised potential stockpile corresponding to the first material based on the material boundary; and applying the neural network to the three-dimensional representation of the first revised potential stockpile and the two-dimensional representation of the first revised potential stockpile.

7. The method of claim 1, wherein determining the volume of the stockpile based on the three-dimensional representation of the stockpile comprises:

determining a ground reference surface based on the boundary of the potential stockpile; and calculating the volume of the stockpile by comparing the ground reference surface and the three-dimensional representation of the stockpile.

8. The method of claim 1, further comprising:

receiving a second plurality of digital aerial images of the site captured by one or more UAVs during a second flight;

based on a known location of the stockpile from the plurality of digital aerial images, identifying the stockpile from the second plurality of digital aerial images captured during the second flight;

generating a new three-dimensional representation of the stockpile from the second plurality of digital aerial images; and determining a change in volume of the stockpile based on the three-dimensional representation of the stockpile and the new three-dimensional representation of the stockpile.

9. A system comprising:

at least one processor; and at least one non-transitory computer readable storage medium storing instructions that, when executed by the at least one processor, cause the system to:

utilize a plurality of digital aerial images of a site captured by a UAV during a flight to generate a three-dimensional representation of the site and a two-dimensional representation of the site;

apply an elevation filter to the three-dimensional representation of the site to generate a three-dimensional representation of a potential stockpile on the site and a boundary of the potential stockpile;

generate a two-dimensional representation of the potential stockpile from the two-dimensional representation of the site based on the boundary of the potential stockpile;

determine that the potential stockpile is a stockpile by applying a neural network to the two-dimensional representation of the potential stockpile and the three-dimensional representation of the potential stockpile, wherein the neural network is trained to identify stockpiles from two-dimensional training inputs and three-dimensional training inputs; and determine a volume of the stockpile based on the three-dimensional representation of the stockpile.

10. The system of claim 9, further comprising instructions that, when executed by the at least one processor, cause the system to train the neural network by:

providing the neural network with a training two-dimensional representation and a training three-dimensional representation corresponding to a ground-truth stockpile classification;

utilizing the neural network to predict a stockpile classification for the two-dimensional representation and the three-dimensional representation; and determining one or more loss functions by comparing the predicted stockpile classification and the ground-truth stockpile classification.

11. The system of claim 9, wherein the three-dimensional representation of the site comprises a three-dimensional point cloud and the two-dimensional representation of the site comprises a two-dimensional orthophoto.

12. The system of claim 11, wherein the three-dimensional representation of the site comprises a plurality of points and further comprising instructions that, when executed by the at least one processor, cause the system to apply the elevation filter by:

identifying a highest point of the plurality of points from the three-dimensional representation of the site;

determining additional points within a radius of the highest point; and based on a determination that the additional points satisfy a threshold stockpile gradient relative to the highest point, utilizing the additional points to generate the three-dimensional representation of the potential stockpile.

13. The system of claim 9, further comprising instructions that, when executed by the at least one processor, cause the system to:

apply a material classifier to the two-dimensional representation of the potential stockpile to identify a material boundary between a first material in the potential stockpile and a second material in the potential stockpile;

generate a two-dimensional representation of a first revised potential stockpile corresponding to the first material based on the material boundary; and apply the neural network to the two-dimensional representation of the first revised potential stockpile.

14. The system of claim 9, further comprising instructions that, when executed by the at least one processor, cause the system to:

receive a second plurality of digital aerial images of the site captured by one or more UAVs during a second flight;

based on a known location of the stockpile from the plurality of digital aerial images, identify the stockpile from the second plurality of digital aerial images captured during the second flight;

generate a new three-dimensional representation of the stockpile from the second plurality of digital aerial images; and determine a change in volume of the stockpile based on the three-dimensional representation of the stockpile and the new three-dimensional representation of the stockpile.

15. A non-transitory computer readable medium storing instructions thereon that, when executed by at least one processor, cause a computer system to:

utilize a plurality of digital aerial images of a site captured by a UAV during a flight to generate a three-dimensional representation of the site and a two-dimensional representation of the site;

apply an elevation filter to the three-dimensional representation of the site to generate a three-dimensional representation of a potential stockpile on the site and a boundary of the potential stockpile;

generate a two-dimensional representation of the potential stockpile from the two-dimensional representation of the site based on the boundary of the potential stockpile;

determine that the potential stockpile is a stockpile by applying a neural network to the two-dimensional representation of the potential stockpile and the three-dimensional representation of the potential stockpile, wherein the neural network is trained to identify stockpiles from two-dimensional training inputs and three-dimensional training inputs; and determine a volume of the stockpile based on the three-dimensional representation of the stockpile.

16. The non-transitory computer readable medium of claim 15, further comprising instructions that, when executed by the at least one processor, cause the computer system to apply the elevation filter by applying a ground return algorithm that identifies and removes non-ground objects from the three-dimensional representation to generate a three-dimensional representation of the site.

17. The non-transitory computer readable medium of claim 16, wherein the three-dimensional representation of the site comprises a plurality of points and further comprising instructions that, when executed by the at least one processor, cause the computer system to apply the elevation filter by:

identifying a highest point of the plurality of points from the three-dimensional representation of the site;

determining additional points within a radius of the highest point; and based on a determination that the additional points satisfy a threshold stockpile gradient relative to the highest point, utilizing the additional points to generate the three-dimensional representation of the potential stockpile.

18. The non-transitory computer readable medium of claim 17, further comprising instructions that, when executed by the at least one processor, cause the computer system to apply the elevation filter by:

identifying a set of points in the three-dimensional representation of the site adjacent to the three-dimensional representation of the potential stockpile that do not satisfy the threshold stockpile gradient relative to the three-dimensional representation; and generating the boundary of the potential stockpile based on the identified set of points.

19. The non-transitory computer readable medium of claim 15, further comprising instructions that, when executed by the at least one processor, cause the computer system to:

apply a material classifier to the two-dimensional representation of the potential stockpile to identify a material boundary between a first material in the potential stockpile and a second material in the potential stockpile;

generate a two-dimensional representation of a first revised potential stockpile corresponding to the first material based on the material boundary; and apply the neural network to the two-dimensional representation of the first revised potential stockpile.

20. The non-transitory computer readable medium of claim 19, wherein the material classifier comprises at least one of: a clustering algorithm that clusters portions of the two-dimensional representation based on color or a neural network trained to identify different materials in potential stockpiles based on training two-dimensional representations.

* * * * *